US010402773B2

(12) United States Patent
Ramalingam et al.

(10) Patent No.: US 10,402,773 B2
(45) Date of Patent: Sep. 3, 2019

(54) SYSTEM, METHOD, AND NON-TRANSITORY COMPUTER-READABLE STORAGE MEDIA FOR USE IN DELIVERING ITEMS TO A CUSTOMER

(71) Applicant: Wal-Mart Stores, Inc., Bentonville, AR (US)

(72) Inventors: Chandrasekar Ramalingam, Belmont, CA (US); Varun Sahu, San Mateo, CA (US); Nelnish Singh, Leeds (GB); Sathish Ragu Vignesh Rathinam, Sunnyvale, CA (US); Gurucharan Shiriyaar, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 305 days.

(21) Appl. No.: 14/610,959

(22) Filed: Jan. 30, 2015

(65) Prior Publication Data

US 2016/0224934 A1 Aug. 4, 2016

(51) Int. Cl.
*G06Q 30/00* (2012.01)
*G06Q 10/08* (2012.01)
*G06Q 30/06* (2012.01)

(52) U.S. Cl.
CPC ..... *G06Q 10/0833* (2013.01); *G06Q 30/0635* (2013.01)

(58) Field of Classification Search
CPC ..... G06Q 10/00; G06Q 30/0635; H04L 67/00

(Continued)

(56) References Cited

U.S. PATENT DOCUMENTS

| 6,010,239 A * | 1/2000 | Hardgrave | G07F 7/00 700/213 |
| 2002/0152128 A1 * | 10/2002 | Walch | G06Q 10/08 705/26.2 |

(Continued)

OTHER PUBLICATIONS

Porges, Seth. "What It's Like to Use Alfred: The Butler Service for the Time-Crunched." Forbes. Forbes, Nov. 19, 2014. Web. Jun. 2, 2017.*

(Continued)

*Primary Examiner* — Jason B Dunham
*Assistant Examiner* — Arielle E Weiner
(74) *Attorney, Agent, or Firm* — Bryan Cave Leighton Paisner LLP

(57) ABSTRACT

A system for use in delivering physical customer items to a customer is described. The system includes a database and a server computer. The database includes customer item lists that include customer item records indicative of physical customer-owned items previously collected from customers. The server computer includes a processor that is programmed to display a website including a plurality of consumer goods and allow the customer to select goods for purchase and delivery. The processor also retrieves a customer item list associated with the customer, displays customer-owned items that are eligible for delivery, and allows the customer to select eligible customer-owned items to be included in a customer delivery order request. The processor also generates and displays a delivery order report including the selected consumer goods, the selected eligible customer-owned items, and a customer specified delivery location for use in assembling and delivering the goods and customer-owned items.

20 Claims, 21 Drawing Sheets

(58) Field of Classification Search
USPC ............ 705/346, 26.1–27.2, 26.81; 709/203
See application file for complete search history.

(56) References Cited

U.S. PATENT DOCUMENTS

| | | | | |
|---|---|---|---|---|
| 2003/0033181 A1* | 2/2003 | Simon | .............. | G06Q 10/06311 705/7.24 |
| 2006/0195362 A1* | 8/2006 | Jacobi | .................... | G06Q 30/02 705/343 |
| 2006/0271437 A1* | 11/2006 | Maggio | .................. | G06Q 10/08 705/346 |
| 2014/0095350 A1* | 4/2014 | Carr | ..................... | G06Q 10/083 705/26.8 |
| 2014/0280510 A1* | 9/2014 | Putnam | ................... | H04L 67/10 709/203 |
| 2015/0294084 A1* | 10/2015 | McCauley | .......... | G06F 19/3456 705/2 |
| 2016/0129587 A1* | 5/2016 | Lindbo | ................ | B65G 1/1378 700/218 |

OTHER PUBLICATIONS

Alsever, Jennifer. "TaskRabbit, Zaarly: Want a Minion? There's an App for That." CNNMoney. Cable News Network, Aug. 11, 2011. Web. Jun. 2, 2017.*

Christensson, Per. "Database Definition." TechTerms. Sharpened Productions, Oct. 27, 2009. Web. Sep. 12, 2018. <https://techterms.com/definition/database>.*

Christensson, Per. "Server Definition." TechTerms. Sharpened Productions, Apr. 16, 2014. Web. Sep. 12, 2018. <https://techterms.com/definition/server>.*

Delivery.com challenges app developers to change the local delivery experience. (Feb. 10, 2014). PR Newswire Retrieved from https://search.proquest.com/docview/1496699039?accountid=14753 (Year: 2014).*

* cited by examiner

| CUSTOMER ITEM LIST | | |
|---|---|---|
| CUSTOMER ID | CUSTOMER ITEM ID | STATUS |
| 1 | SHIRT-008 | PICKUP |
| 1 | TROUSERS-010 | COLLECTED |
| 1 | SHOES-012 | ELIGIBLE FOR DELIVERY |
| 2 | REPAIR ITEM-001 | PICKUP |
| 3 | SHIRT-005 | ELIGIBLE FOR DELIVERY |

FIG. 16

| CUSTOMER ITEM LIST | | |
|---|---|---|
| CUSTOMER ID | CUSTOMER ITEM ID | STATUS |
| 1 | SHIRT-008 | ELIGIBLE FOR DELIVERY |
| 1 | TROUSERS-010 | ELIGIBLE FOR DELIVERY |
| 1 | SHOES-012 | ELIGIBLE FOR DELIVERY |

< BACK | SELECT | CANCEL | NEXT >

FIG. 17

| S.No | Scenario | 17-Apr | 18-Apr | 19-Apr | 20-Apr - 23-Apr | 24-Apr | 25-Apr | 26-Apr | 27-Apr | 28-Apr | 29-Apr | 30-Apr | 1-May |
|---|---|---|---|---|---|---|---|---|---|---|---|---|---|
| 1 | Multiple "Submitted" orders with Dry Clean return items | Customer places order<br><br>Order# - 123<br>Dry Clean - Shirt<br>Delivery date - 24-Apr | Customer places order<br><br>Order# - 124<br>Dry Clean - Trousers<br>Delivery date 27-Apr | | | Customer receives order<br><br>Deliver Order# 123<br>(Pickup Dry Clean - Shirt) | 1 Item in store for Dry Clean<br><br>Shirt | Customer places order<br><br>Order# - 125<br>Return Dry Clean - Shirt (added to order)<br>Delivery date - 1-May | Customer receives order<br><br>Deliver order# - 124<br>(Pickup Dry Clean - Trousers) | 2 items in store for Dry Clean<br><br>1) Shirt<br>2) Trousers | | Customer places order<br><br>Order# - 128<br>Return Dry clean - Trousers (Added to order) | Only trousers would be part of this order. |
| 2 | Customer cancels a Dry clean return order | Customer places order<br><br>Order# - 123<br>Dry Clean - Shirt<br>Delivery date - 24-Apr | Customer places order<br><br>Order# - 124<br>Dry Clean - Trousers<br>Delivery date 27-Apr | | | Customer receives order<br><br>Deliver Order# 123<br>(Pickup Dry Clean - Shirt) | 1 Item in store for Dry Clean<br><br>Shirt | Customer places order<br><br>Order# - 125<br>Return Dry Clean - Shirt(added to order)<br>Delivery date - 1-May | Customer receives order<br><br>Deliver order# - 124<br>(Pickup Dry Clean - Trousers) | 2 items in store for Dry Clean<br><br>1) Shirt<br>2) Trousers | | Customer cancels order<br><br>Cancel Order# 125 | Customer logs into the site to create another order.<br><br>Both Shirt and Trousers would be added to the trolley<br><br>Both shirt and trousers would be added to the trolley. |
| 3 | Customer amends the order on the immediate day after Dry clean pickup | Customer places order<br><br>Order# - 123<br>Dry Clean - Shirt<br>Delivery date - 24-Apr | Customer places order<br><br>Order# - 124<br>Dry Clean - Trousers<br>Delivery date 27-Apr | Customer places order<br><br>Order# - 127<br>Dry Clean - Skirt<br>Delivery date 02-May | | Customer receives order<br><br>Deliver Order# 123<br>(Pickup Dry Clean - Shirt) | 1 Item in store for Dry Clean<br><br>Shirt | Customer amends order<br><br>Order# - 127<br>Dry Clean - Skirt<br>Delivery date - 02-May<br>Return Dry Clean - Shirt(added to order) | Customer receives order<br><br>Deliver order# - 124<br>(Pickup Dry Clean - Trousers) | Customer amends order<br><br>Order# - 127<br>Dry Clean - Skirt<br>Delivery date - 02-May<br>Return Dry Clean - Shirt(added to order)<br>Trousers will not be added to trolley | | Return items would be added to the trolley 24hrs after the pickup. For order # 127, shirt is added into the trolley after 24 hrs. So when the order is amended while the return item is in the trolley, it would be part of the order. Similarly, if the order is amended again, before trousers(return item) is added to the trolley, then it wouldnt be part of the order. | |
| 4 | Customer amends the order couple of days after dry clean pickup | Customer places order<br><br>Order# - 123<br>Dry Clean - Shirt<br>Delivery date - 24-Apr | Customer places order<br><br>Order# - 124<br>Dry Clean - Trousers<br>Delivery date 27-Apr | Customer places order<br><br>Order# - 127<br>Dry Clean - Skirt<br>Delivery date 02-May | | Customer receives order<br><br>Deliver Order# 123<br>Pickup Dry Clean - Shirt) | 1 Item in store for Dry Clean<br><br>Shirt | Customer amends order<br><br>Order# - 127<br>Dry Clean - Skirt<br>Delivery date - 02-May<br>Return Dry Clean - Shirt(added to order) | Customer receives order<br><br>Deliver order# - 124<br>(Pickup Dry Clean - Trousers) | 2 items in store for Dry Clean<br><br>1) Shirt<br>2) Trousers | | | Customer amends order<br><br>Order# - 127<br>Dry Clean - Skirt<br>Delivery date - 02-May<br>Return Dry Clean - Shirt,<br>Return Dry Clean - Trousers(added to order)<br><br>Both Shirt and Trousers would be added to the trolley |

FIG. 20

| S.No | Scenario | 17-Apr | 18-Apr | 19-Apr | 20-Apr - 23-Apr | 24-Apr | 25-Apr | 26-Apr | 27-Apr | 28-Apr | 29-Apr | 30-Apr | 1-May | 2-May | 3-May | 4-May |
|---|---|---|---|---|---|---|---|---|---|---|---|---|---|---|---|---|
| 5 | Customer abandons trolley between two grocery orders with Dry cleaning items | Customer places order Order# - 123 Dry Clean - Shirt Delivery date - 24-Apr | Customer places order Order# - 124 Dry Clean - Trousers Delivery date - 27-Apr | Customer places order Order# - 127 Dry Clean - Skirt Delivery date - 02-May | | Customer receives order Deliver Order# - 123 (Pickup Dry Clean - Shirt) | 1 Item in store for Dry Clean Shirt | Customer logs into the site to create another order, (but leaves without completing order) Return Dry clean - Shirt (added to trolley) | Customer receives order Deliver order# 124 (Pickup Dry Clean - Trousers) | 2 items in store for Dry Clean 1) Shirt 2) Trousers | | | Customer logs into the site to complete the order Return Dry clean - Shirt (added to trolley) Return Dry clean - Trousers (added to trolley) Both Shirt and Trousers be added to the trolley | | | |
| 6 | Customer amends and cancels orders with Dry cleaning items | Customer places order Order# - 123 Dry Clean - Shirt Delivery date - 24-Apr | Customer places order Order# - 124 Dry Clean - Trousers Delivery date - 27-Apr | Customer places order Order# - 127 Dry Clean - Skirt Delivery date - 02-May | | Customer receives order Deliver Order# - 123 (Pickup Dry Clean - Shirt) | 1 Item in store for Dry Clean Shirt | Customer places order Order# - 125 Return Dry Clean - Shirt(added to order) Delivery date - 1-May | Customer receives order Deliver order# 124 (Pickup Dry Clean - Trousers) | 2 items in store for Dry Clean 1) Shirt 2) Trousers | Customer Amends order Order# - 125 Return Dry Clean - Shirt Return Dry Clean - Trousers(added to order) Delivery date - 1-May | Customer Cancels order Order# - 125 | 2 items in store for Dry Clean 1) Shirt 2) Trousers | Customer receives order Order# - 127 (Pickup Dry Clean - Skirt) Delivery date 02-May | 3 items in store for Dry Clean 1) Shirt 2) Trousers 3) Skirt | Customer logs into the site to complete the order Shirt, Trousers and Skirt would be added to the trolley |
| 7 | Customer rebooks a prior cancelled order while there are Dry clean return items already in the trolley | Customer places order Order# - 123 Dry Clean - Shirt Delivery date - 24-Apr | Customer places order Order# - 124 Dry Clean - Trousers Delivery date - 27-Apr | Customer cancels prior order Order#-120 Dry Clean Skirt | | Customer receives order Deliver Order# - 123 (Pickup Dry Clean - Shirt) | 1 Item in store for Dry Clean Shirt | Customer places order Order# - 125 Return Dry Clean - Shirt(added to order) Delivery date - 1-May | Customer receives order Deliver order# - 124 (Pickup Dry Clean - Trousers) | 2 items in store for Dry Clean 1) Shirt 2) Trousers | | Customer rebooks prior cancelled order Original Order#-120 New Order# - 128 Dry Clean Trousers (Added from previous order) Return Dry Clean - Trousers(added to order) | | | | |
| 8 | Customer rebooks a prior cancelled order while there are Dry clean return items already in the trolley | Customer places order Order# - 123 Dry Clean - Shirt Delivery date - 24-Apr | Customer places order Order# - 124 Dry Clean - Trousers Delivery date - 27-Apr | Customer cancels prior order Order#-120 Dry Clean Skirt | | Customer receives order Deliver Order# - 123 (Pickup Dry Clean - Shirt) | 1 Item in store for Dry Clean Shirt | | Customer receives order Deliver order# - 124 (Pickup Dry Clean - Trousers) | 2 items in store for Dry Clean 1) Shirt 2) Trousers | | Customer rebooks prior cancelled order Original Order#-120 New Order# - 128 Dry Clean Trousers (Added from previous order) Return Dry Clean - Shirt(added to order) Return Dry Clean - Trousers(added to order) | | | | |

FIG. 21

SYSTEM, METHOD, AND NON-TRANSITORY COMPUTER-READABLE STORAGE MEDIA FOR USE IN DELIVERING ITEMS TO A CUSTOMER

FIELD OF THE DISCLOSURE

The present invention relates to the remote ordering of goods or items by a customer that are to be assembled at a store or facility, and more particularly, to systems, methods, and computer-readable storage media for use in collecting customer-owned physical items from a customer specified location and delivering previously collected customer-owned items from a store or facility to the customer.

BACKGROUND

Many customers desire to order items or goods remotely, e.g., on-line, through the Internet, or using a specially designed application or app on a mobile device, such as a tablet or cell phone. The customer may desire that the goods in the order be delivered to their home or that the goods in the order be assembled and ready for the customer to pick-up at a specific location, e.g., a particular store, typically at a specific time. In addition, customers may desire to have customer-owned items collected, serviced, and returned to the customer after the corresponding services have been rendered.

However, in some instances, collecting, servicing, and returning customer-owned items may include significant delivery expense such that the benefit and convenience offered by such services is outweighed by the costs associated with providing such services.

The present invention is aimed at one or more of the problems identified above.

SUMMARY OF THE INVENTION

In different embodiments of the present invention, systems, methods, and computer-readable storage media allow customers to place orders for goods and items to be delivered from a store to a customer specified location and to collect customer-owned items from the customer when the delivery order is delivered. The customer-owned items may then be serviced and returned to the customer with the next customer delivery order.

In one embodiment, a system for use in delivering physical items to a customer is provided. The system includes a database and a server computer. The database includes a product list and a plurality of customer item lists. The product list includes a plurality of consumer goods available for purchase by the customer. Each customer item list includes a unique customer ID and customer item records indicative of physical customer-owned items previously collected from a corresponding customer. The server computer includes a processor that is programmed to display a website including a plurality of consumer goods to a customer via a customer device and allow the customer to select at least one of the consumer goods for purchase. The processor receives, via the customer device, a request from the customer to purchase and deliver at least one consumer good to a customer specified location and responsively generates a customer delivery order request including the selected consumer good and a customer ID associated with the customer. The processor also retrieves a customer item list associated with the customer ID from the database, identifies and displays customer-owned items that are eligible for delivery, and allows the customer to select at least one eligible customer-owned item to be included in the customer delivery order request. The processor also generates and displays a delivery order report indicative of the customer delivery order request including the selected consumer goods, the selected eligible customer-owned items, and a customer specified delivery location. The delivery order report is used in assembling and delivering the selected consumer goods and the selected eligible customer-owned items to the customer specified location.

In other embodiments, methods for use in delivering physical items to a customer are provided. A method includes storing a product list and a plurality of customer item lists in a database. The product list includes a plurality of consumer goods available for purchase by the customer. Each customer item list includes a unique customer ID and customer item records indicative of physical customer-owned items previously collected from a corresponding customer. The method includes displaying a web site including a plurality of consumer goods to a customer via a customer device and allowing the customer to select at least one of the consumer goods for purchase. The method also includes receiving, via the customer device, a request from the customer to purchase and deliver at least one consumer good to a customer specified location and responsively generating a customer delivery order request including the selected consumer good and a customer ID associated with the customer. The method also includes retrieving a customer item list associated with the customer ID from the database, identifying and displaying customer-owned items that are eligible for delivery, and allowing the customer to select at least one eligible customer-owned item to be included in the customer delivery order request. The method further includes generating and displaying a delivery order report indicative of the customer delivery order request including the selected consumer goods, the selected eligible customer-owned items, and a customer specified delivery location. The delivery order report is used in assembling and delivering the selected consumer goods and the selected eligible customer-owned items to the customer specified location.

In still other embodiments, one or more non-transitory computer-readable storage media, have computer-executable instructions embodied thereon is provided. When executed by at least one processor, the computer-executable instructions cause the at least one processor to display a website including a plurality of consumer goods to a customer via a customer device and allow the customer to select at least one of the consumer goods for purchase. The processor also receives, via the customer device, a request from the customer to purchase and deliver at least one consumer good to a customer specified location and responsively generates a customer delivery order request including the selected consumer good and a customer ID associated with the customer. The processor retrieves a customer item list associated with the customer ID from a database including customer item records indicative of physical customer-owned items previously collected from a corresponding customer, identifies and displays customer-owned items that are eligible for delivery, and allows the customer to select at least one eligible customer-owned item to be included in the customer delivery order request. The processor generates and displays a delivery order report indicative of the customer delivery order request including the selected consumer goods, the selected eligible customer-owned items, and a customer specified delivery location.

BRIEF DESCRIPTION OF THE FIGURES

Other advantages of the present disclosure will be readily appreciated, as the same becomes better understood by reference to the following detailed description when considered in connection with the accompanying drawings wherein:

Non-limiting and non-exhaustive embodiments of the present invention are described with reference to the following figures, wherein like reference numerals refer to like parts throughout the various views unless otherwise specified.

FIG. 16 is an illustration of an exemplary screenshot from the system of FIG. 1, according to an embodiment of the present invention;

FIG. 17 is an illustration of an exemplary screenshot from the system of FIG. 1, according to an embodiment of the present invention;

FIGS. 20-21 are flowcharts of a method that may be used with the system shown in FIG. 1, according to an embodiment of the present invention.

Figure 1:
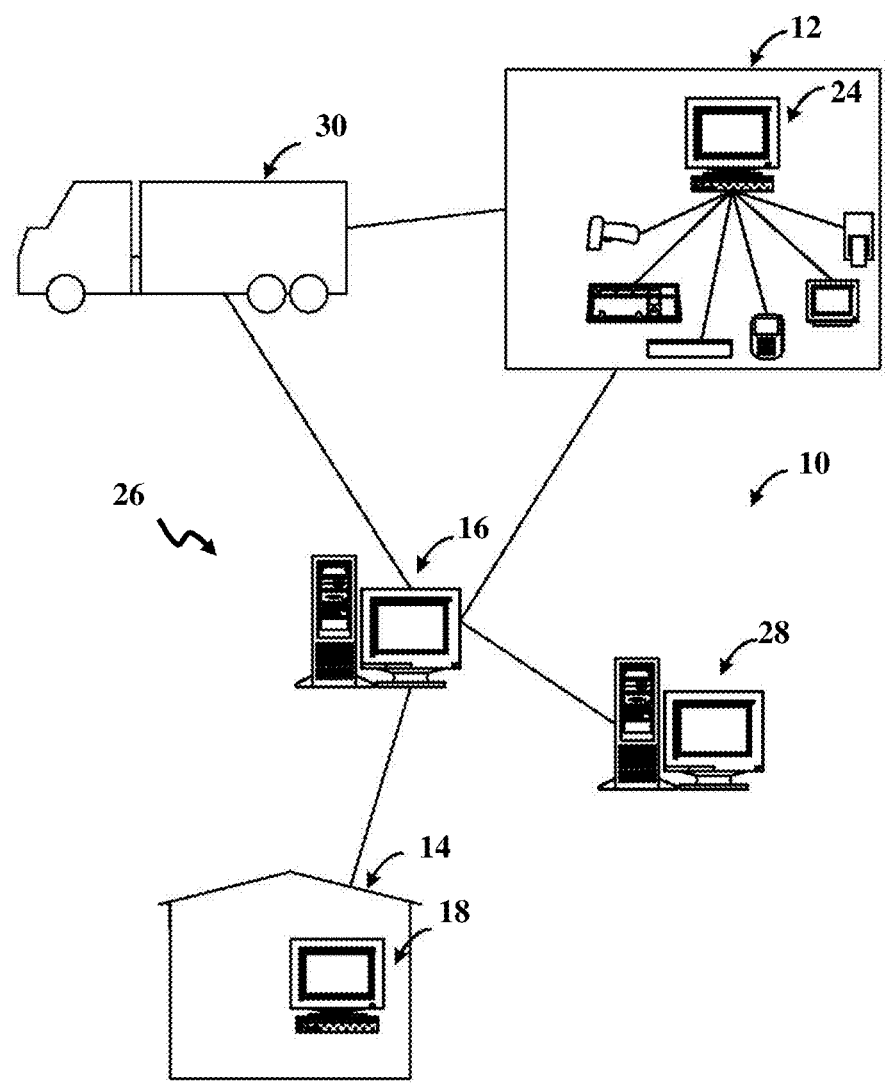
FIG. 1 is a schematic illustrating various aspects of a system according to the present disclosure.

Corresponding reference characters indicate corresponding components throughout the several views of the drawings skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

With reference to the FIGS. and in operation, the present invention provides a system 10, methods and computer product media that facilitates the assembly of an order for a customer that the customer may desire to pick-up at a specification location, e.g., a store or to have delivered. The disclosure particularly describes how a customer may order goods on-line or remotely and arrange for delivery of the order at a customer-specified location, such as a home, office, retail location, transportation hub, and/or storage lockers to have the goods in the order delivered to the customer. In addition, the present disclosure describes how a system associated with a store arranges an on-line or remotely placed order to be assembled and ready for pick-up or delivery and to allow a customer to request customer-owned items, such as clothes, shoes, packages, and the like, to be collected from the customer specified location, and to be returned to the customer after the completion of a service being performed on the items.

In one embodiment, the system of the present invention enables service delivery (dry cleaning, shoe repair etc) as part of a grocery delivery process. To optimize the delivery costs, the service items are picked up when the original grocery order is delivered. The system will enable automatic tagging of the service delivery in the next customer touch point, e.g. another grocery delivery order, order amendments, etc. The system contains a rule engine which will adapt to various customer touch points, e.g. change of addresses, shipping between stores, Click and Collect preferences, order cancellations, order amendments and other opportunities to deliver the services earlier than promised. The rule engine also tracks the progress of the customer's service orders and automatically tags the order when the customer's services will be delivered back to the customer.

The system may also allow customers and delivery van drivers to dynamically add/change service items and service requests minutes before the grocery items are delivered and/or in the customer's doorstep. The customer can choose to give items that are different from the original order and they can add service items to their order at their will even without placing orders prior to placing the order. In one embodiment, the system allows customers to hand-over customer-owned items (items for dry cleaning, shoes for repair, items needing servicing, previously purchased items for return, and/or any suitable customer item) to a delivery personnel at the door step (e.g. when goods are delivered to the customer from a delivery personnel) without even a prior pick-up item originally ordered as part of the delivery. The system enables the delivery personnel to dynamically add this item to the delivery order (through hand-held devices etc) and process it further. In addition, the system allows customer items to be picked-up by delivery personnel and taken to Store A, and allows the customer items to be returned by Store B or C. The customer items can also be delivered back to a Click and Collect location, Delivery lockers and other remote collection points (not attached to the store). The system allows customers to drop off customer items (dry clean etc) to an automated locker (without prior delivery order). These items would be processed further and will be delivered back as part of the customer's next order.

The rule engine may also take into account shipping between stores in case the original service orders are registered with a different store and the customer's future grocery delivery has moved to another store.

Referring to FIG. 1, an exemplary environment in which the system 10 operates is illustrated. A customer may desire to purchase items from a facility at a specified location, such as a store 12. The store 12 may be representative of a larger corporate environment which may provide many avenues of interface with a customer. In a modern shopping environment, a store 12 may include both one or more brick and mortar retail locations and an on line retail location.

It should be noted that the store 12 may include, or be part of, a plurality of stores 12. The customer, as explained below, may be allowed to choose the store from the plurality of stores 12.

Generally, the customer may desire to order items from the store 12 and have the items (or goods) delivered to a customer-specified location 14 such as the customer's residence, business, other residence, storage lockers, etc. . . . . Alternatively, the customer may desire to pick-up the order from the store 12. In addition, the customer may desire to have one or more customer-owned items to be collected from the customer and delivered to a service department to perform services associated with the customer-owned item. For example, in one embodiment, the customer may desire to have customer-owned clothes collected from the customer by a delivery service and have the clothes delivered to a dry cleaning service to perform a dry cleaning service on the clothes. In addition, the customer may desire to have the serviced customer-owned items returned to the customer with the next delivery of goods ordered from the store 12. In one embodiment, the services associated with the customer-owned items may be performed within a corresponding store 12 such as, for example, a dry cleaning service and/or shoe repair service being performed within the store 12. Alternatively, services associated with the customer-owned items may be provided by a 3$^{rd}$ party service provider, for example, an independent dry cleaning service.

The system 10, in addition to facilitating the assembly of the order at the store, may be configured to allow or facilitate orders to be efficiently delivered to the customer location 14 and to allow orders to be delivered to a customer-specified location 14 or to be picked up at a selected store 12. The customer may desire and request that the order be delivered or picked up the same day that the order is placed or a future day. Furthermore, the customer may request a delivery or pick-up time.

For clarity in discussing the various function of the system 10, multiple computers and/or servers are discussed as performing different functions in delivering goods to a customer and receiving customer-owned items from the customer. These different computers (or servers) may, however, be implemented in multiple different ways such as modules within a single computer, as nodes of a computer system, etc. . . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

The system 10 may include or have an associated first server such as, for example, an order server 16. The order server 16 may host a store a website including one or more web pages which allow a customer to, via a customer device 18, interact with the store 12 and order server 16 to place an order for one or more items or goods from the store 12. Alternatively, the order server 16 may communicate and interact directly with the customer device 18 via appropriate software applications or apps running on the order server 16 and the customer device 18. In addition, the order server 16 may allow a customer to request one or more customer-owned items to be collected from the customer-specified location and to request one or more services associated with the customer-owned item to be performed by the store and/or a 3$^{rd}$ party service provider. The order server 16 also allows the customer to select one or more previously collected and service customer-owned items to be returned to the customer-specified location.

The order server 16 may include a database (shown in FIG. 5) that includes a product list including products, goods, and/or services which are for sale within the store 12 with information relevant to these items. In addition, the database may include one or more customer item lists 20 (shown in FIGS. 16 and 17) that include customer item records 22 indicative of physical customer-owned items associated with a corresponding customer. The order server 16 may include software to allow delivery of items to a customer or to facilitate pick-up of the items from the store 12 by the customer. Particularly, the order server 16 may provide an internet webpage to allow a customer to select consumer goods, select customer-owned items for pickup, select serviced customer-owned items for delivery, select or enter delivery or pick-up information, and purchase the items in a virtual shopping environment. The order server 16 may communicate with other computers, servers, or components of the system 10 to deliver the items to the customer or to arrange for pick-up of the items (see below).

The system 10 may also include a second server such as, for example an order assembly server 24. The order assembly server 24 may interact with the store 12 and assist the store employees in picking items for orders and assembling the order. The order assembly server 24 and other hardware components that may be located at the store or facility may be referred to as an order fulfillment system 26.

The system 10 may also include a third server such as, for example, a delivery server 28. The delivery server 28 may manage delivery routes for a delivery service 30 which delivers goods to and from a customer. The delivery server 28 may determine when, during a day, there is sufficient time to deliver an order to the customer and may provide information to the order server 16 to allow the order server 16 to provide customized information to the customer during the ordering process to allow the customer to select a desired delivery window which may be fulfilled by the store 12 and delivery service 30.

A customer purchasing items from the store 12 and/or selecting customer-owned items for delivery to a customer location 14 or pick-up at a store 12 and/or customer location 14 will typically view an internet webpage or access an application or app corresponding to the store. The customer may have an account with the store and may sign into the system 10. A customer account may include information about the customer such as a unique customer ID, name, address, past purchase history, etc. The webpage or app may display, to the customer, consumer goods and/or customer-owned items at the store 12 which are available for pick-up or delivery. Not all items may be available for pick-up (at a specific or selected store) or for delivery. The customer may select items or goods for purchase. In signing into an account or entering information for a purchase, the order server 16 may receive (from the customer) customer information which facilitates delivery of goods to the customer. Particularly, the order server 16 may receive the address of the customer-specified location 14 where purchased items and/or customer-owned items are to be delivered. Alternatively, the order server 16 may receive a customer selection of a store 12 at which the customer desires to pick-up the order.

Figure 18:
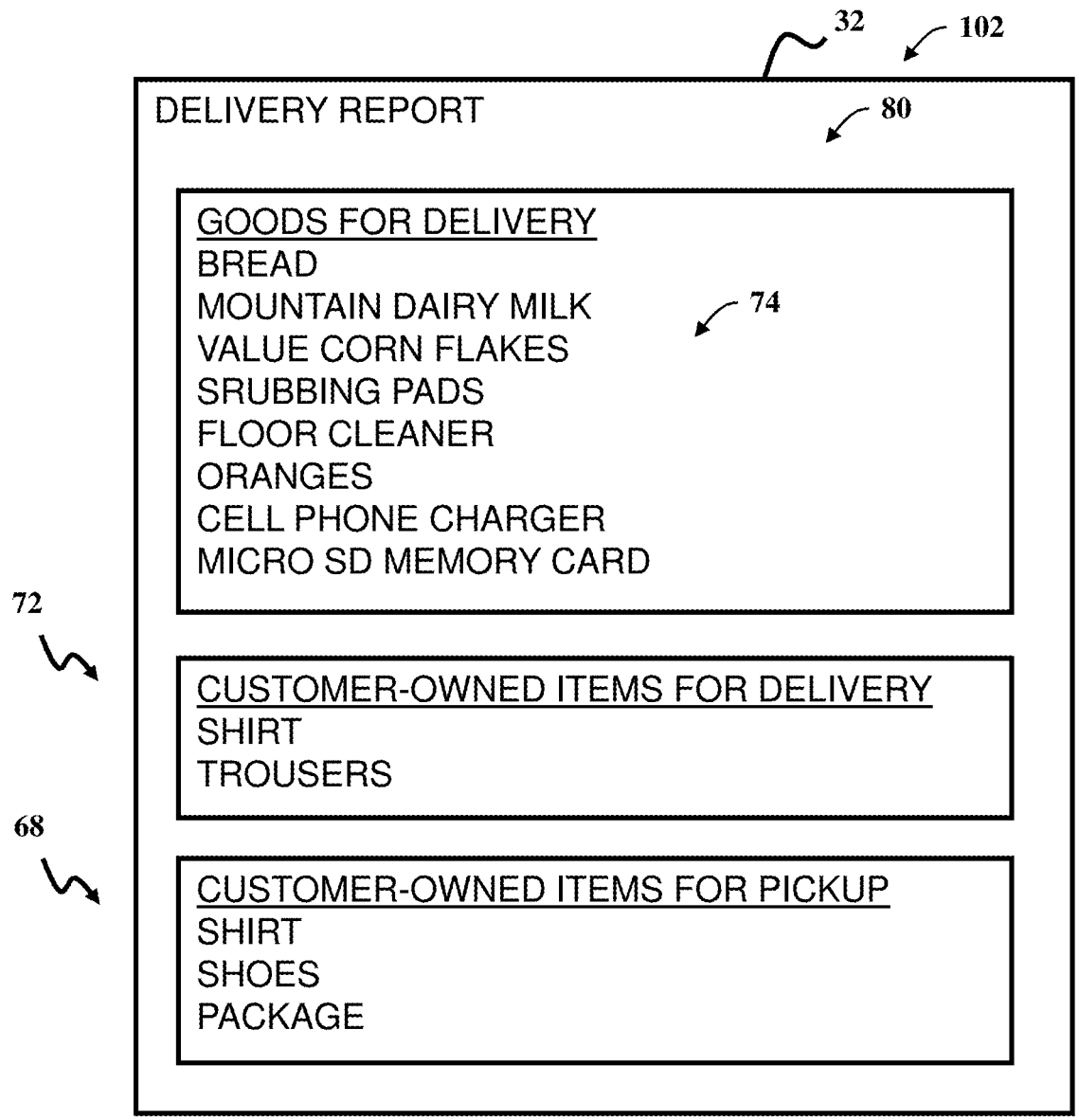
FIG. 18 is an illustration of an exemplary screenshot from the system of FIG. 1, according to an embodiment of the present invention.
Figure 19:
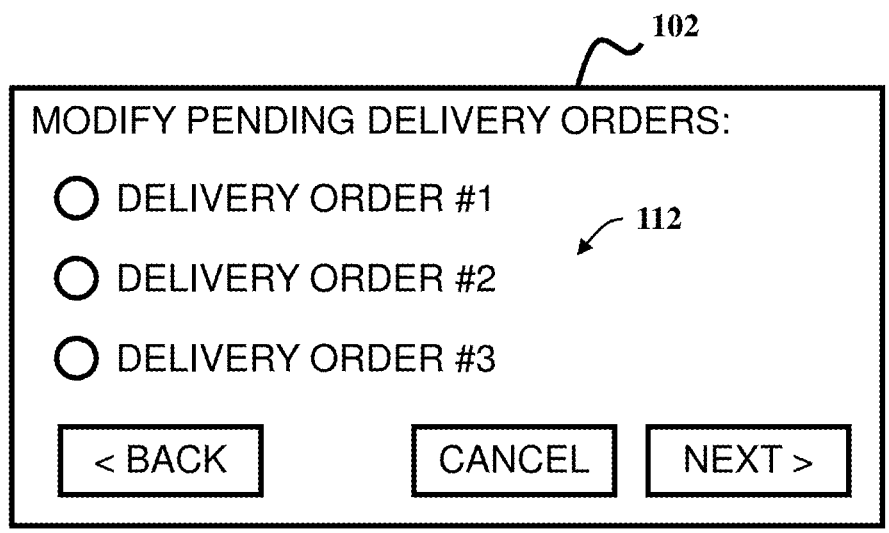
FIG. 19 is an illustration of an exemplary screenshot from the system of FIG. 1, according to an embodiment of the present invention.

The order server 16 may provide customer information, such as the address of the customer-specified location 14, to the delivery server 28. The delivery server 28 may use the customer information to determine time periods during the day when a delivery service 30 may deliver the items to the customer. The delivery server 28 may manage multiple delivery trucks/routes throughout the day for the delivery service 30 and may determine how much time a delivery truck has available and how much time is required to deliver the items to the customer location 14. The delivery server 28 may determine when during the day a delivery truck (or other delivery service) may deliver the items to the customer. The delivery server 28 may provide information regarding when the delivery service 30 is able to deliver items to the customer location 14 to the order server 16. In one embodiment, the order server 16 may generate a delivery report 32 (shown in FIG. 18) including a list of purchased goods and/or customer-owned items to be delivered to the customer, and transmit the delivery report 32 to the delivery server 28 for use in delivering the purchased goods and/or customer-owned items to the customer. In one embodiment, the delivery server 28 may display the delivery report to a delivery operator such as, for example, a delivery truck operator or delivery personnel, via an operator device such as, for example a delivery device 34 to enable the delivery operator to view and/or modify the delivery report 32. In one embodiment, the delivery device 34 may include a handheld device 36 (shown in FIGS. 6 and 7). One embodiment of the system 10 and the delivery of the orders to the customer location 14 using the delivery service 30 is described within commonly owned U.S. Patent Application Publication No. 2014/0095350, published Apr. 3, 2014, which is hereby incorporated by reference.

The order server 16 may then transmit information regarding the order to the store 12, and in particular to the order assembly server 24. The order assembly server 24 may be coupled to, or in communication with, include a computer system as well as one or more operator devices such as, for example, assembler devices 38 to assist store employees in preparing customer orders for delivery. The assembler devices, which may be handheld devices (see below), may provide information to a store employee or assembler, may allow a store employee to scan items, and may allow the assembler(s) to print stickers and/or labels, notices, notes, reports, and/or any suitable tangible medium for those items. The store employee may collect items throughout the store 12 and arrange for those items to be assembled and ready for delivery to one or more customer locations 14 or for pick-up at the store 12. In addition, the order assembly server 24 may receive a notification of customer-owned items being collected and/or received by the store, store employee, and/or delivery personnel, via the handheld devices 36, and transmit the notification to the order server 16 for use in generating customer item records that are indicative of the received customer-owned items. For example, in one embodiment, a delivery personnel and/or store employee may receive a customer-owned item for servicing. The delivery personnel and/or store employee may access the customer account associated with the received customer-owned item via the handheld device 36, and generate and transmit a message to the order server 16 to indicate that the customer-owned item has been received and/or collected from the customer. In addition, in one embodiment, a delivery personnel and/or store employee may receive a customer-owned item that has not been previously included and/or identified in the customer account. The delivery personnel and/or store employee may use the delivery device 34 and/or the assembler device 38 to generate and transmit a notification to the order server 16 indicating that a customer-owned item has been received.

In one aspect of the invention, the assembler is an employee, i.e., a person, or employees, who utilize the handheld device(s) 36 to assemble the customer order. In another aspect of the present invention, the assembler may be, at least in part, an automatic inventor retrieval system, or AIRS, that automatically retrieves the items from the facility. The AIRS may include one or more robots under control of a suitable controller that is able to read the items in the customer order, retrieve the items from the facility, and place the items in a designated location, such as in a designated bin, in order to facilitate assembly of the customer order. The specific nature, including number and type, of robots required will be dependent upon the layout of the facility, the manner in which the items or goods are stored, and the nature of the items or goods. In some embodiments, of the present invention the assembler devices may be integrated with the AIRS. For purposes of the discussion below, the terms "assembler", "assembler device" or "handheld device" include (1) an employee/person who utilizes an assembler or handheld device and/or (2) an automated inventory retrieval system (AIRS) with an integrated assembler device.

In one embodiment, the system 10 may also communicate with a $3^{rd}$ party server 40 (shown in FIG. 2) associated with a $3^{rd}$ party service provider. Moreover, the order server 16 may communicate with the $3^{rd}$ party server 40 to transmit and receive information associated with customer-owned items that may be serviced by the $3^{rd}$ party service provider. For example, in one embodiment, upon receiving and/or collecting a customer-owned item from a customer, the order server 16 may transmit a notification to the $3^{rd}$ party server 40 indicating that the received customer-owned item is ready for servicing by the $3^{rd}$ party service provider. In one embodiment, for example, the order server 16 may receive a notification from the delivery server 28 that a customer-owned item, e.g. clothes for dry cleaning, has been collected from a customer location 14 by delivery personnel and/or a store employee. The order server 16 may transmit a notification to the $3^{rd}$ party server 40 that the customer-owned items, e.g customer clothes, have been picked up by deliver personnel and are ready to be serviced, e.g. dry cleaned, by the $3^{rd}$ party service provider. In addition the order server 16 may receive information from the $3^{rd}$ party server 40 that the customer-owned items have been serviced and returned to the store 12 from the $3^{rd}$ party service provider and/or are eligible for delivery to the customer.

Figure 2:
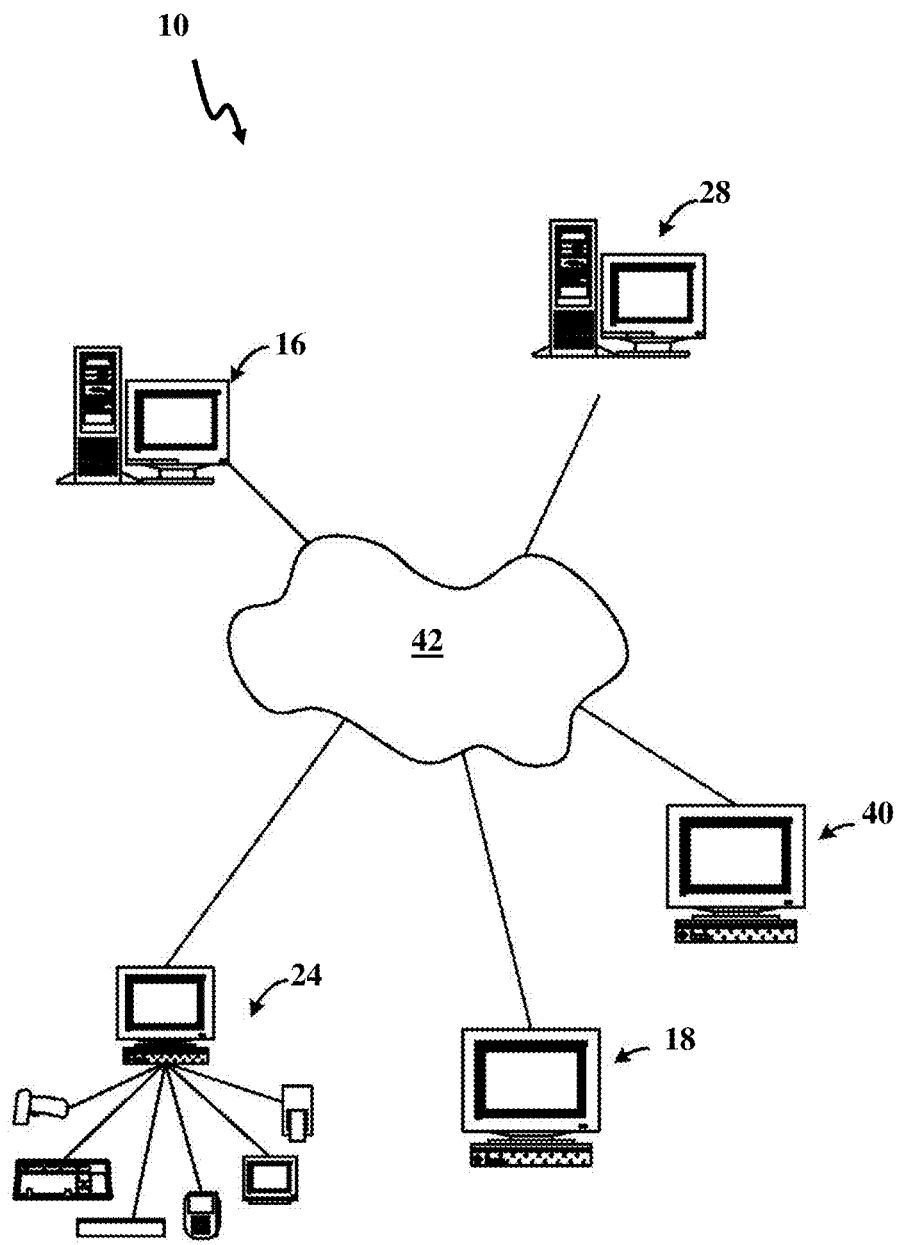
FIG. 2 is a schematic illustrating a portion of the system of FIG. 1 in context of order fulfillment and delivery, according to an embodiment of the present invention.

Referring to FIG. 2, in selected embodiments, the software, hardware, and associated components of the system 10 may be programmed and configured to implement one or more embodiments described herein. A customer may communicate with the order server 16 via the customer device 18 and a communications connection or network 42 to select items for purchase. The order server 16 may also communicate with the order assembly server 24, the delivery server 28, and the $3^{rd}$ party server 40, via a communications connection 42. The communications connection 42 may be any suitable connection, including the Internet, file transfer protocol (FTP), an Intranet, LAN, a virtual private network (VPN), cellular networks, etc. . . . , and may utilize any suitable or combination of technologies including, but not limited to, wired and wireless connections, always on connections, connections made periodically, and connections made as needed.

The customer device 18, delivery device 34, and/or assembler device 38 may include any suitable device, including, but not limited to, a desktop computer, a laptop or notebook computer, a tablet, a handheld mobile device including a cellular telephone, and the like.

Figure 3:
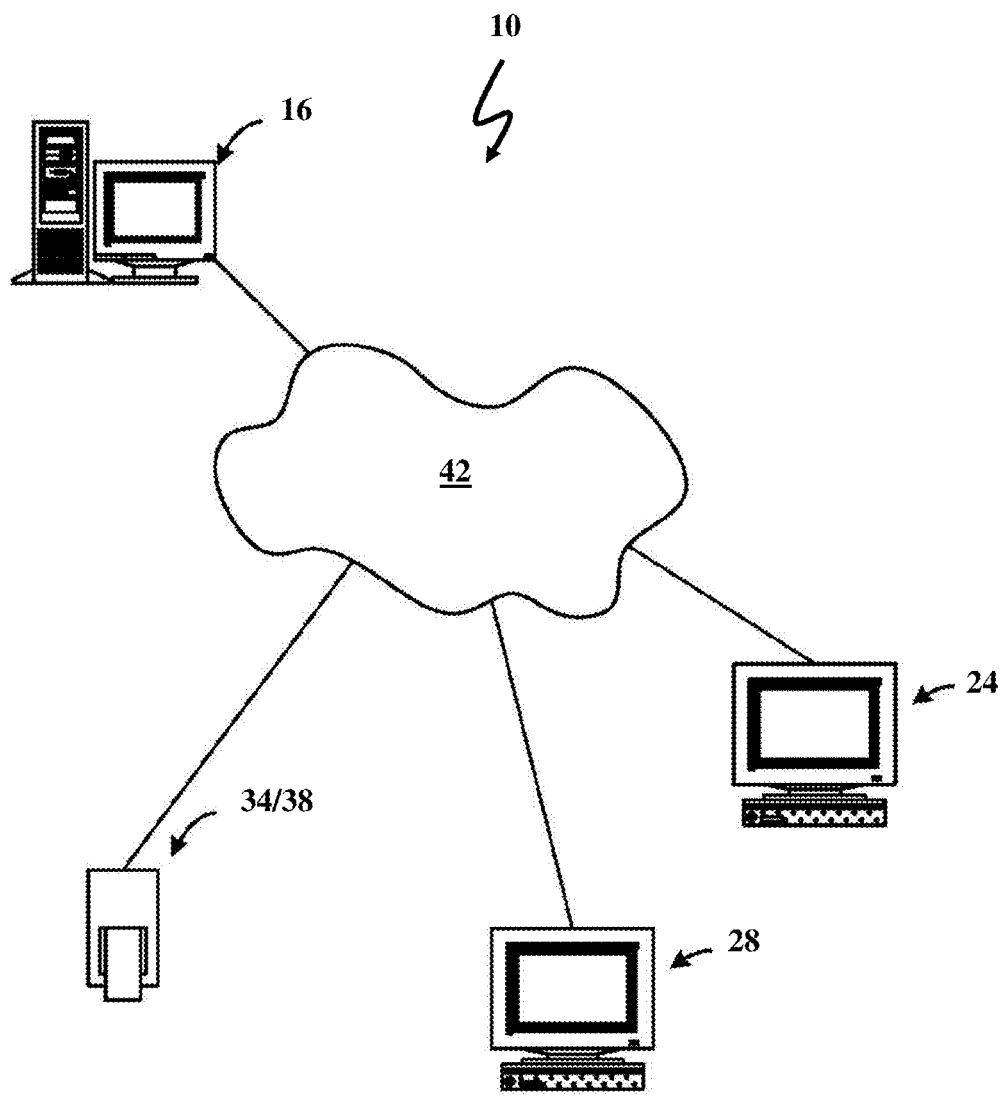
FIG. 3 is a second schematic illustrating a portion of the system of FIG. 1 in context of order fulfillment and delivery, according to an embodiment of the present invention.

Referring to FIG. 3, in selected embodiments, the hardware, software, or hardware and software of the order server 16, the order assembly server 24, and the delivery server 28 may be configured to receive and utilize item information as described herein, performing functions associated with the order server 16 and order assembly server 24. The order assembly server 24 may communicate with the customer device 18, the delivery device 34, and an assembler device 38 via a communications connection or network 42. In this manner, the various aspects of the system may be exemplified as software, modules, nodes, etc. of a store computer or order assembly server 24.

Figure 4:
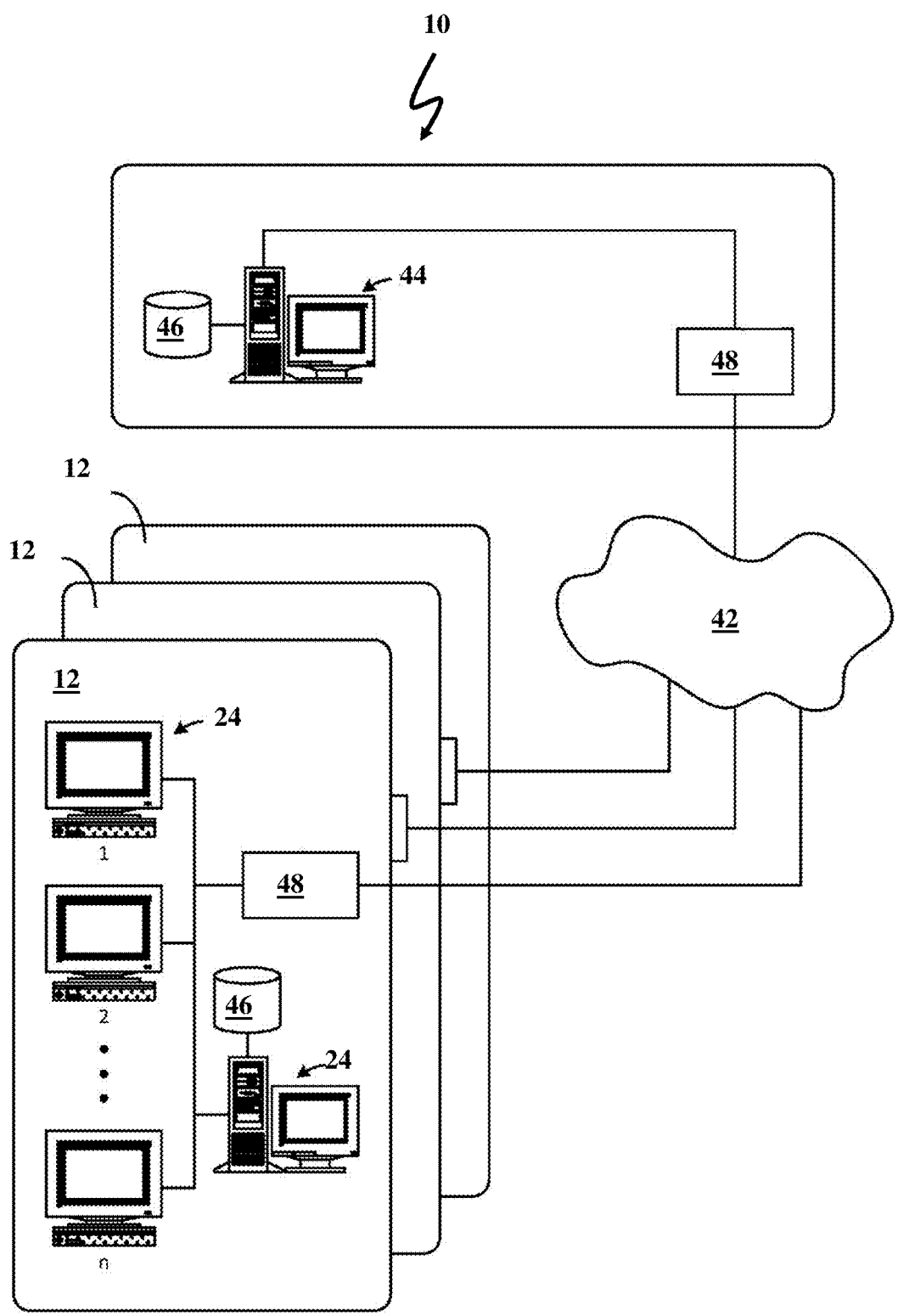
FIG. 4 is a schematic illustrating the system of FIG. 1 in a multiple store environment, according to an embodiment of the present invention.

Referring to FIG. 4, in selected embodiments, the system 10 may operate substantially independently, as a stand-alone unit. Alternately, a store system 44 may operate as a larger system. For example, multiple stores 12 may operate at different locations (e.g., different brick-and-mortar stores, facilities, and/or warehouses). In such embodiments, each local system may have an order assembly server 24 as well as other computers or handheld devices 36, database and data storage devices 46, and networking devices 48 as necessary. Each local system may be connected to the order server 16 via a network or internet connection 42. The order server 16 may be associated with database and data storage device 46 and a network device 48 as necessary.

As referenced above, the order server 16 may be configured to perform one or more functions associated with receiving an order from a customer, managing the delivery or pick-up of the customer orders, and streamlining the collection of items for customer orders.

Figure 5:
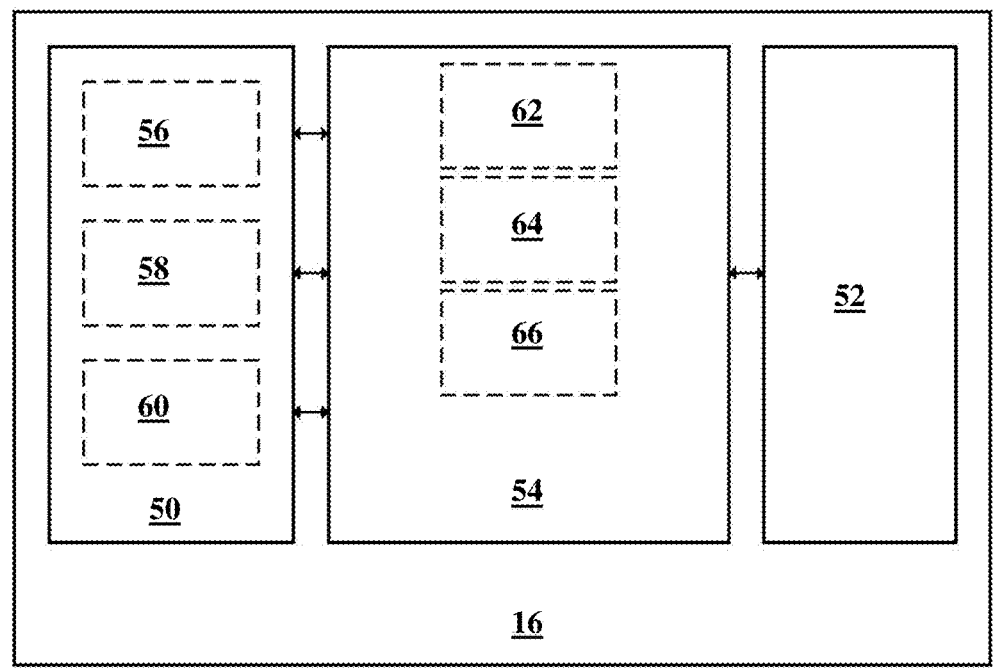
FIG. 5 is a schematic illustrating example components of a server, according to an embodiment of the present invention.

FIG. 5 illustrates an example of the order server 16 configured to perform one or more of the requested functions. In the illustrated embodiment, the order server 16 may include a processing device 50, a communication device 52, and a memory device 54.

The processing device 50 can include memory, e.g., read only memory (ROM) and random access memory (RAM), storing processor-executable instructions and one or more processors that execute the processor-executable instructions. In embodiments where the processing device 50 includes two or more processors, the processors can operate in a parallel or distributed manner. In an example, the processing device 50 may execute a web or application module 56, a delivery module 58, and an order fulfillment module 60.

The communication device 52 is a device that allows the order server 16 to communicate with another device, e.g., the customer device 18, delivery device 34, assembler device 38, etc. The communication device 52 can include one or more wireless transceivers for performing wireless communication and/or one or more communication ports for performing wired communication.

The memory device 54 is a device that stores data generated or received by the order server 16. The memory device 54 can include, but is not limited to, a hard disc drive, an optical disc drive, and/or a flash memory drive. Further, the memory device 54 may be distributed and located at multiple locations. The memory device 54 is accessible to the processing device 50. In some embodiments, the memory device 54 stores a customer database 62, a consumer product database 64, and a delivery database 66.

In some examples, the customer database 62 can store information associated with a customer. The customer database 62 may, for example, store information associated with a customer account and may include account preferences and customer contact information. The customer database 62 may also store information regarding a customer delivery address as well as specific details regarding delivery of items to the delivery address. The customer database 62 may be queried by the processing device 50 and may provide information to the processing device to facilitate receiving an order from a customer and delivering an order to the customer.

In the illustrated embodiment, the customer database 62 stores a plurality of customer item lists 20 (shown in FIG. 16). Each customer item list 20 includes a unique customer ID and customer item records indicative of physical customer-owned items previously collected from a corresponding customer. The customer item list 20 may include one or more pickup customer item records 68 that are indicative of a customer-owned item being requested for collection by a customer at a customer-specified location. The pickup customer item record 68 may include an associated customer ID and a unique pickup item ID. The customer item list 20 may also include one or more collected customer item records 70 that are indicative of customer-owned items that have been received and/or collected by delivery personnel and/or store employees. In addition, the customer item list 20 may also include one or more eligible customer item records 72 that are associated with collected customer-owned items. Each eligible customer item record 72 is indicative of the associated customer-owned item being eligible for deliver and/or return to the customer and/or customer-specified location. In addition, each customer item record may also include product identification codes, such as for example, Universal Product Codes (UPC) codes, item location in the store 12 and/or in $3^{rd}$ party service providers, as well as other information associated with the customer-owned items.

Figure 12:
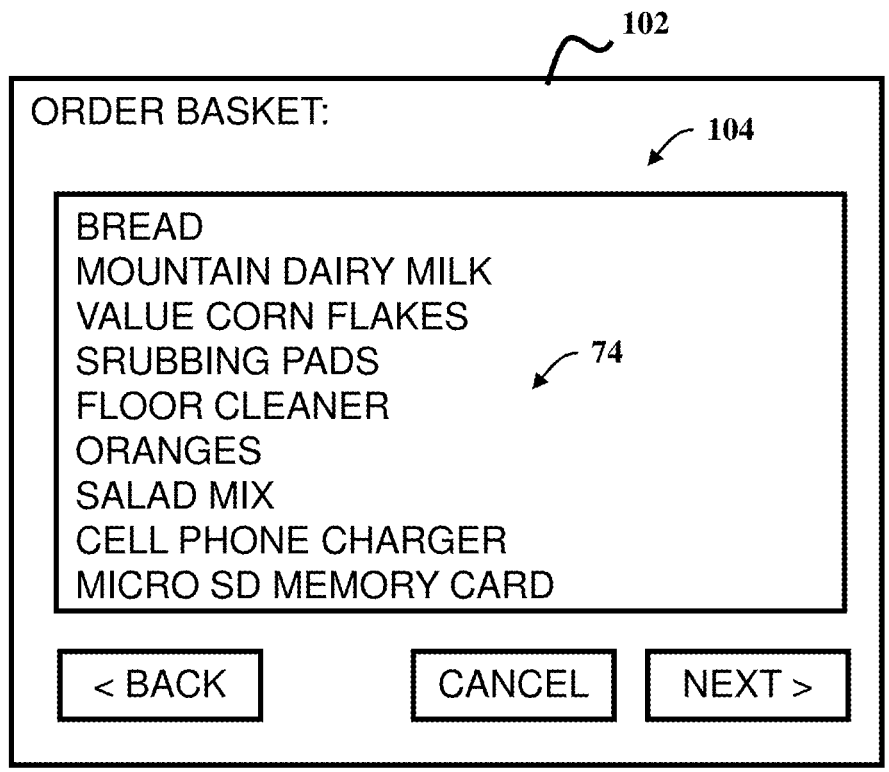
FIG. 12 is an illustration of an exemplary screenshot from the system of FIG. 1, according to an embodiment of the present invention.
Figure 13:
FIG. 13 is an illustration of an exemplary screenshot from the system of FIG. 1, according to an embodiment of the present invention.
Figure 14:
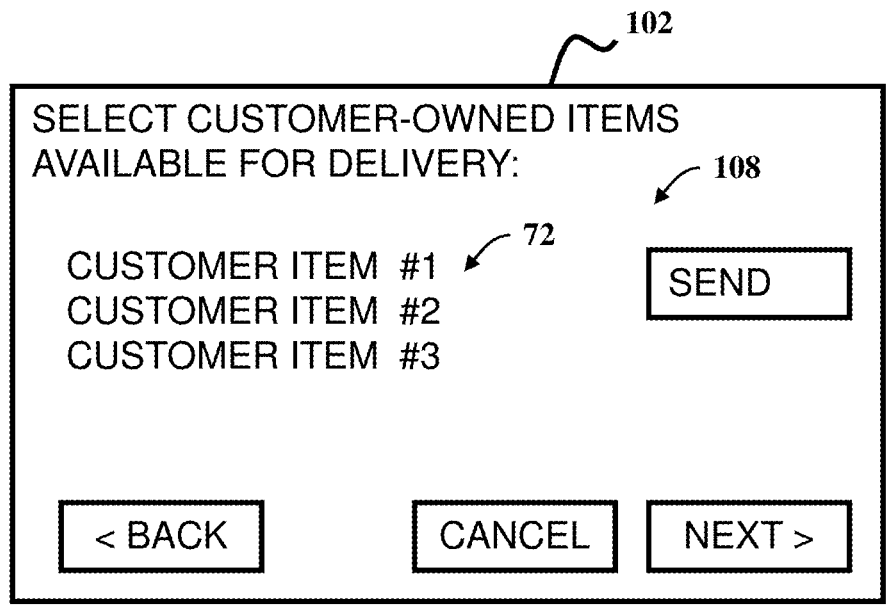
FIG. 14 is an illustration of an exemplary screenshot from the system of FIG. 1, according to an embodiment of the present invention.
Figure 15:
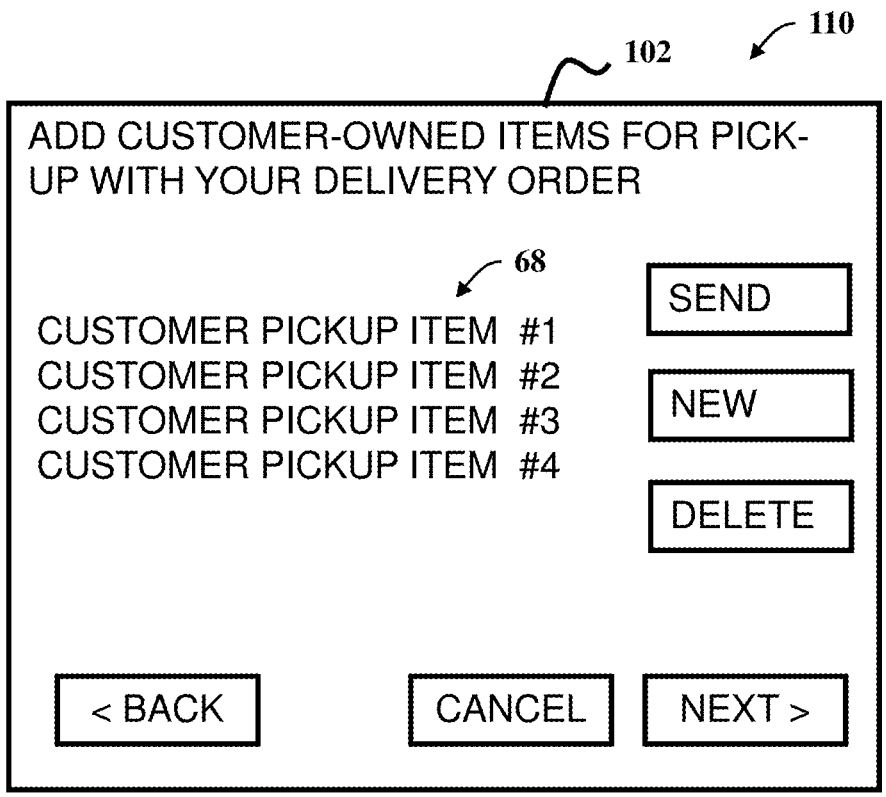
FIG. 15 is an illustration of an exemplary screenshot from the system of FIG. 1, according to an embodiment of the present invention.

In some examples, the consumer product database 64 stores item information associated with goods and/or products, or types of items in the store 12. For example, the product database 64 may store product lists 74 (shown in FIG. 12) including product identification codes, UPC codes, item location in the store 12, as well as other information associated with the goods and/or products. By way of example, the product database 64 may be queried by the processing device 50 and may transmit information to the processing device to facilitate the use of item data.

In some examples, the delivery database 66 stores information to facilitate delivery of customer orders to a customer location 14. The delivery database 66 may store information regarding a map of a delivery area or an area around a store 12, street and traffic information for a delivery area, delivery routes, transit times associated with a delivery area, etc.

The processing device 50 may execute the web or application module 56. The web or application module 56 may present a store interface and item information to a customer, receive customer information and order information, and otherwise handle the purchase transaction with a customer as described herein. The processing device 50 may also execute a delivery module 58. The delivery module 58 may receive customer delivery address information from the web or application module 56 and may determine customer location, compare location with existing delivery routes, determine available delivery times, schedule deliveries, create delivery routes, and otherwise manage delivery of customer orders. The web or application module 56 may receive potential delivery times from the delivery module 58 and present these potential delivery times to a customer to allow the customer to select a delivery window for their order. The processing device 50 may further close orders for a delivery route, finalize the delivery route, and interface with a delivery service 30 to deliver orders to customers.

The processing device 50 may execute an order fulfillment module 60. The order fulfillment module 60 may receive customer order information for a delivery route and may facilitate the collection of items from a store to fulfill the customer orders. The order fulfillment module 60 may combine orders together, arrange items according to a predetermined picking order through a store 12, and direct a store employee through the store 12 to collect items for the customer orders.

Figure 7:
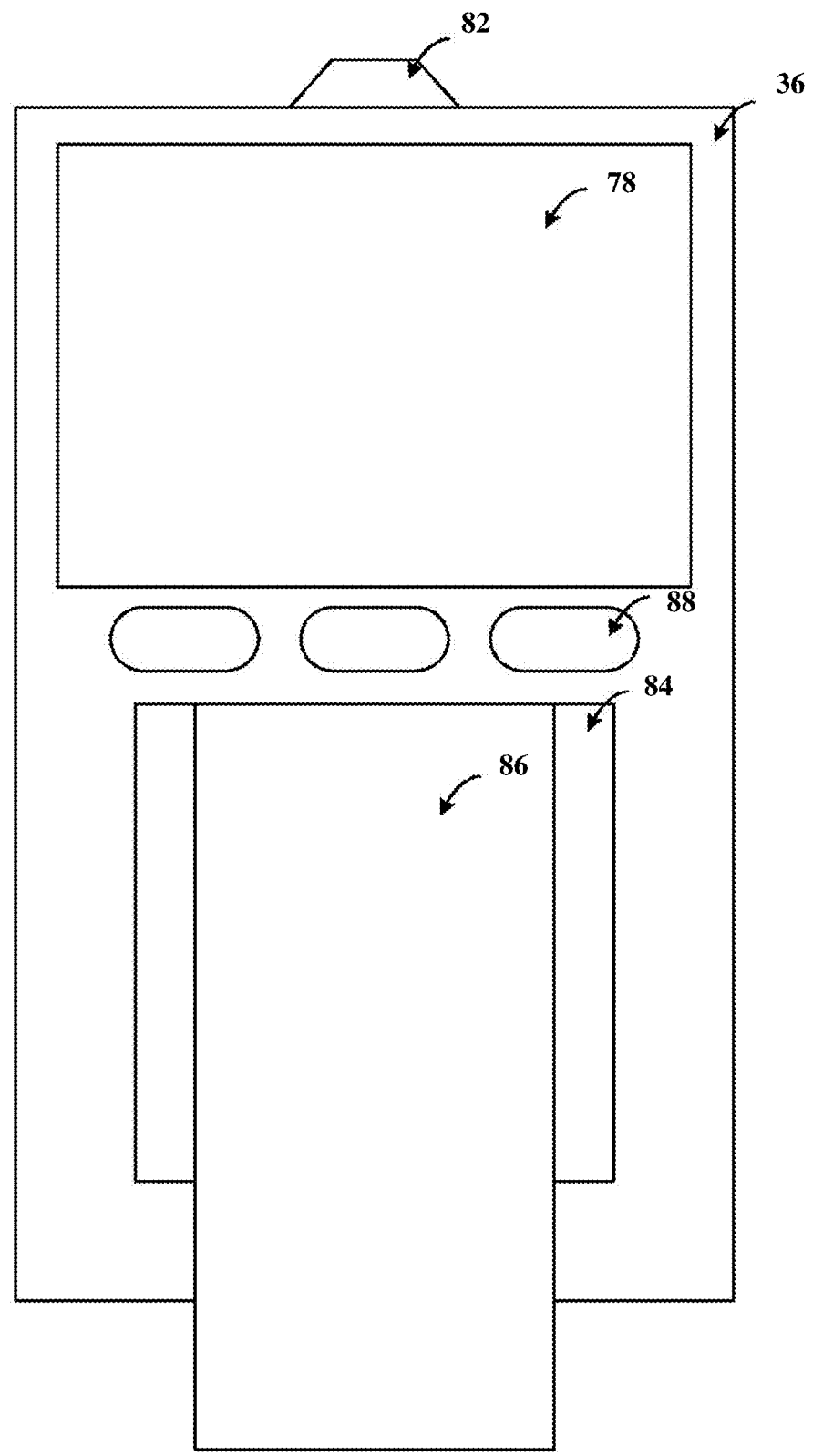
FIG. 7 is a schematic of a handheld device, according to an embodiment of the present invention.

Referring to FIG. 7, a store employee, assembler, and/or delivery personnel may use a handheld computer device 36 while collecting items and/or delivering items for the customer orders. The handheld device 36 may perform several functions. The handheld device 36 may communicate with the order server 16 and/or the order assembly server 24 to receive a list of items which need to be collected from the store 12 and/or the customer-specified location to fulfill the orders. The handheld device 36 may include a display 78. The display 78 may present a list of items to the store employee in the order that the employee will encounter the items while following a picking route through the store 12. The display 78 may also present the picking route to the employee, indicating how the employee should progress through the store 12 while collecting items for the customer order(s). In addition, the handheld device 36 may also display a delivery order report 80 (shown in FIG. 18) that may include pickup customer item records for use in identifying the requested physical customer-owned item to be collected at the customer specified location.

The order server 16 and/or the order assembly server 24 may store item information for all store items which are available for purchase and/or customer-owned items that are eligible for delivery. For example, the order assembly server 24 may store a product identification code for each available store item and/or customer-owned item, the UPC code for each item, item location on the store shelves, and other information as necessary. When a store employee collects an item for the customer orders, the employee may use a scanner 82 on the handheld device 36 to scan the item UPC code. The handheld device 36 may determine if the item is necessary for the customer orders and may indicate whether or not the item is correct to the employee. If correct, the employee may be directed to place the item in a particular collection receptacle or bin for the respective customer order. The handheld device 36 may use a printer 84 to print a sticker label 86 for the item. The sticker label 86 may include a code, barcode, or other machine readable code to identify a particular customer order to which the item pertains. The label 86 may be affixed to the item as the employee collects the item. If desired, the employee may carry multiple boxes, containers, or bins corresponding to the various customer orders and may sort items into the appropriate order receptacle as the items are collected throughout the store 12. It is, however, appreciated that there may often be a sufficient number of customer orders to make it impractical to carry sufficient order receptacles through the store 12. The employee may place items into a single receptacle and bring items to a back area of the store 12 for sorting into different customer orders.

The handheld device 36 may include buttons 88 and other input/output or customer interface devices as permit the store employee and/or delivery personnel to perform the designated functions. The handheld device 36 may also include a communications device to permit the handheld device 36 to communicate with the order server 16 and/or the order assembly server 24, such as by communicating over a store wireless network.

Typically, customer orders are finalized and presented via order assembly server 24 after being finalized. The order assembly server 24 may allow store employees to see customer orders which have not been verified. This may allow store employees to monitor large orders or orders in a period of high demand and, if desired, start to collect items for these orders before the desired pick-up time or scheduled delivery time is finalized to be able to meet the demand.

Figure 6:
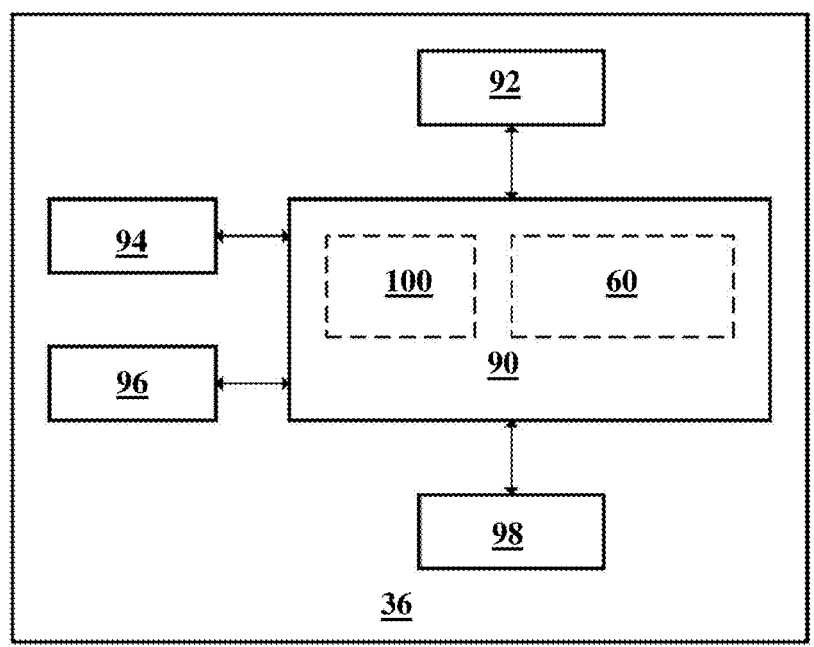
FIG. 6 is a schematic illustrating example components of a handheld device, according to an embodiment of the present invention.

Referring now to FIG. 6, a schematic showing example components of the handheld device 36 is illustrated. The handheld device 36 may include a processing device 90, a user interface 92, an output device 94, a communication device 96, and a memory device 98. It is noted that the handheld device 36 can include other components and some of the components may not be required in every example.

The processing device 90 can include memory, e.g., read only memory (ROM) and random access memory (RAM), storing processor-executable instructions and one or more processors that execute the processor-executable instructions. In embodiments where the processing device 90 includes two or more processors, the processors can operate in a parallel or distributed manner. The processing device 90 can execute an operating system of the handheld device 36. In the illustrative example, the processing device 90 also executes a software module 100 such as scanning and printing software and an order fulfillment module 60.

The user interface 92 is a device that allows a user, a store employee in particular, to interact with the handheld device 36. While one user interface 92 is shown, the term "user interface" can include, but is not limited to, a touch screen, a physical keyboard, a mouse, a microphone, and/or a speaker. The output device 94 is a device which allows a store employee and/or delivery personnel to output information from the handheld device 36. In particular, the output device 94 may allow a store employee and/or delivery personnel to print delivery order reports and/or labels for store items and/or customer-owned items and associate collected store items and/or customer-owned items with a particular customer order. The communication device 96 is a device that allows the handheld device 36 to communicate with another device, e.g., the order server 16, the order assembly server 24 or the delivery server 28. The communication device 96 can include one or more wireless transceivers for performing wireless communication and/or one or more communication ports for performing wired communication. The memory device 98 is a device that stores data generated or received by the handheld device 36. The memory device 98 can include, but is not limited to, a hard disc drive, an optical disc drive, and/or a flash memory drive. The software module 100 may be stored on the memory device 98 and the order fulfillment module 60 may be created from the software module 100.

The order fulfillment module 60 allows a user, a store employee in particular, to efficiently collect items from a store 12 to fulfill customer orders. The order fulfillment module 60 may execute some or all of the functions described herein to receive one or more customer orders, combine those customer orders, order items in the customer orders sequentially according to a predetermined picking route through the store 12, and guide an employee through the store 12 to collect the items necessary to fulfill the customer orders.

FIGS. 8-11 and 20-21 are flowcharts of methods that may be used with the system 10. The methods include a plurality of steps. Each method step may be performed independently of, or in combination with, other method steps. Portions of the methods may be performed by any one of, or any combination of, the components of the system 10. FIGS. 12-18 are exemplary graphical displays that may be displayed by the system 10.

Figure 8:
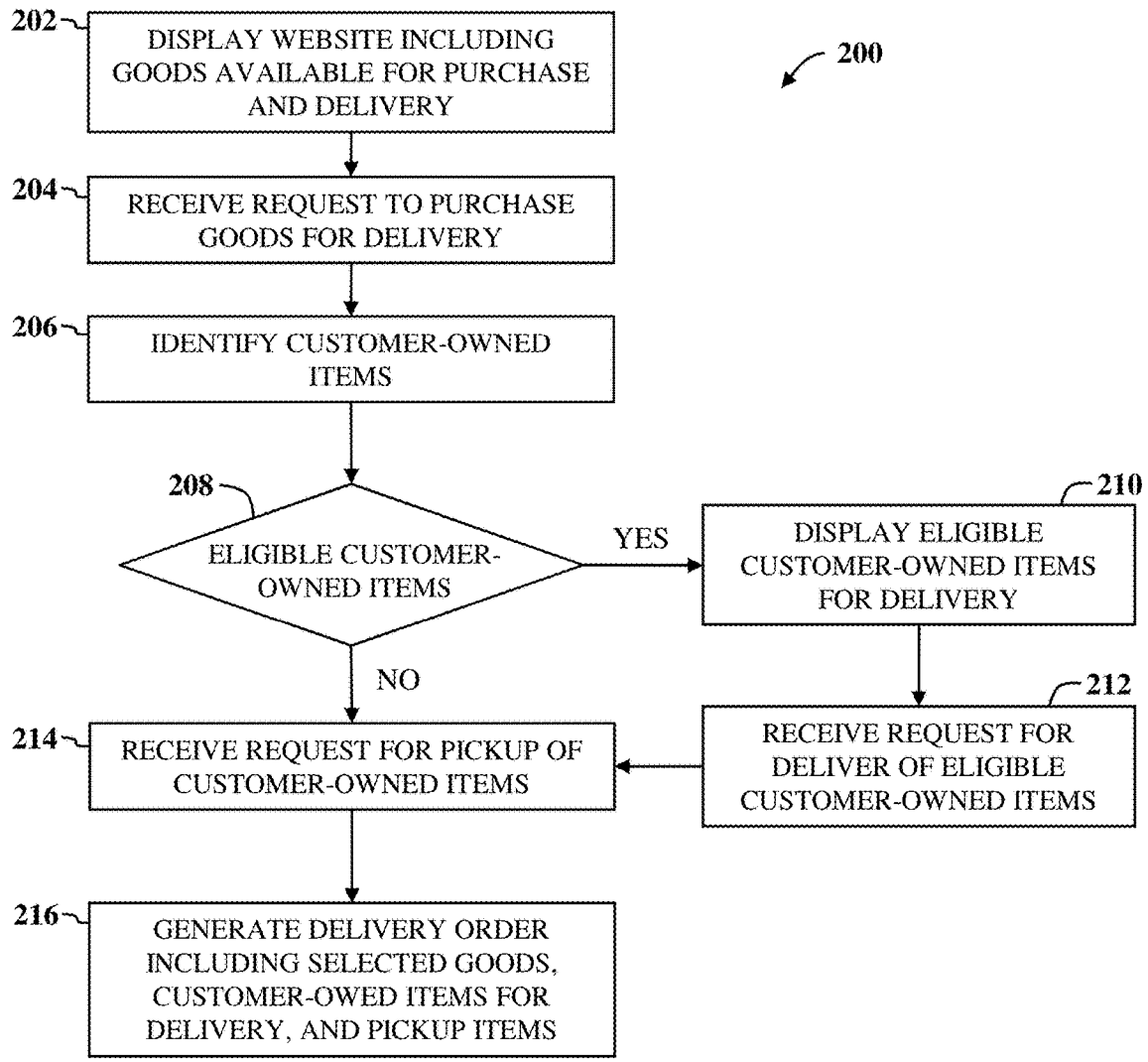
FIG. 8 is a flowchart of a method that may be used with the system shown in FIG. 1, according to an embodiment of the present invention.

In the illustrated embodiment, referring to method 200 illustrated in FIG. 8, in method step 202, the order server 16 receives a request from one or more customer devices 18 to display one or more web pages 102 associated with a website hosted by the system 10, and retrieves and displays the requested web pages 102 on a corresponding customer device 18. In one embodiment, the website may include an e-commerce website that enables a consumer to view and purchase and/or order various goods and services from one or more merchants via the website. In the illustrated embodiment, the order server 16 displays a product webpage 104 including a plurality of consumer products that may be purchased by a consumer via the system 10. For example, in one embodiment, the customer may use a store website or specially designed application or app to order various items for delivery to a customer-specified location 14 or pick-up at a specified store 12. In an on-line store environment, the customer may browse through available items and may select items for purchase. The order server 16 may receive customer information. A customer may create an account or logon to an existing account with the order server 16 including a unique customer ID, or may enter this information while making a purchase. The order server 16 transmits customer information and the customer order to the order assembly server 24.

During method step 202, the order server 16 retrieves a product list 74 from the product database 64 and displays a product webpage 104 including a plurality of consumer goods from the product list 74 that are available for purchase by the customer. In one embodiment, the order server 16 may determine a store location associated with a received customer ID, and retrieve and display consumer goods that are available at the corresponding store location. In addition, the order server 16 may display one or more store locations based on the associated customer address and/or a customer specified delivery location, and display a listing of store locations to allow the customer to select one or more available stores.

In method step 204, the order server 16 receives a request from the customer to purchase and deliver at least one consumer good via the customer device 18. For example, the order server 16 allows the customer to select one or more of the consumer products being displayed on the product webpage 104, and allows the customer to select a customer-specified location 14 for delivery of the selected consumer goods. In addition, the order server 16 responsively generates a customer delivery order request 32 including the selected consumer goods and the customer ID associated with the customer. In one embodiment, the order server 16 displays a customer location selection page 106 that allows the customer to select a customer-specified location for delivery of the purchased consumer goods.

In method step 206, the order server 16 identifies customer-owned items 22 that have previously been collected by a store employee and/or delivery personnel and is currently being held by a store, store employee, and/or $3^{rd}$ party service provider. For example, in the illustrated embodiment, the order server 16 retrieves a customer item list 20 (shown in FIG. 16) associated with the customer ID from the customer database 62 and identifies any customer item records 22 contained in the customer item list 20 and associated with the customer ID.

In method step 208, the order server 16 determines if any customer-owned items are eligible for delivery. For example, the order server 16 may determine if any of the customer item records 22 contained in the corresponding customer item list 20 are eligible for delivery to the customer. In addition, in one embodiment, the order server 16 determines if the customer item list 20 includes any eligible customer item records 72 that are indicative of customer-owned items that have been previously received from the customer and have been serviced by a store employee, service employee, and/or a $3^{rd}$ party service provider and is eligible for return delivery to the customer. Upon determining that the corresponding customer list 20 includes one or more eligible customer item records 72, the system 10 proceeds to method step 210. Alternatively, if the order server 16 does not determine that the customer list 20 includes eligible customer item records 72, the order server 16 proceeds to method step 214.

In method step 210, the order server 16 identifies and displays each customer-owned item that is eligible for delivery with the customer order and allows the customer to select at least one eligible customer-owned item to be included in the customer delivery order request 32. For example, in one embodiment, the order server 16 may display an eligible customer item page 108 that includes a listing of customer-owned items that are eligible for delivery.

In method step 212, the order server 16 receives the customer selection of one or more eligible customer-owned items and updates the customer delivery order request 32 to include the customer selected items. Upon receiving the customer selection of eligible customer-owned items, the order server 16 proceeds to method step 214.

In method step 214, the order server displays a pick-up request webpage 110 and allows the customer to identify customer-owned items to be serviced. Moreover, the order server 16 receives a pick-up request from the customer via the pick-up request webpage 110 including at least one physical customer-owned item to be collected from the customer-specified location 14 upon delivery of the customer delivery order request to the customer-specified location 14. Upon receiving the request, the order server 16 generates and stores a pickup customer item record 68 in the corresponding customer list 20 that is indicative of the requested physical customer-owned item. The pickup customer item record 68 may include the associated customer ID and a pickup item ID.

Figure 11:
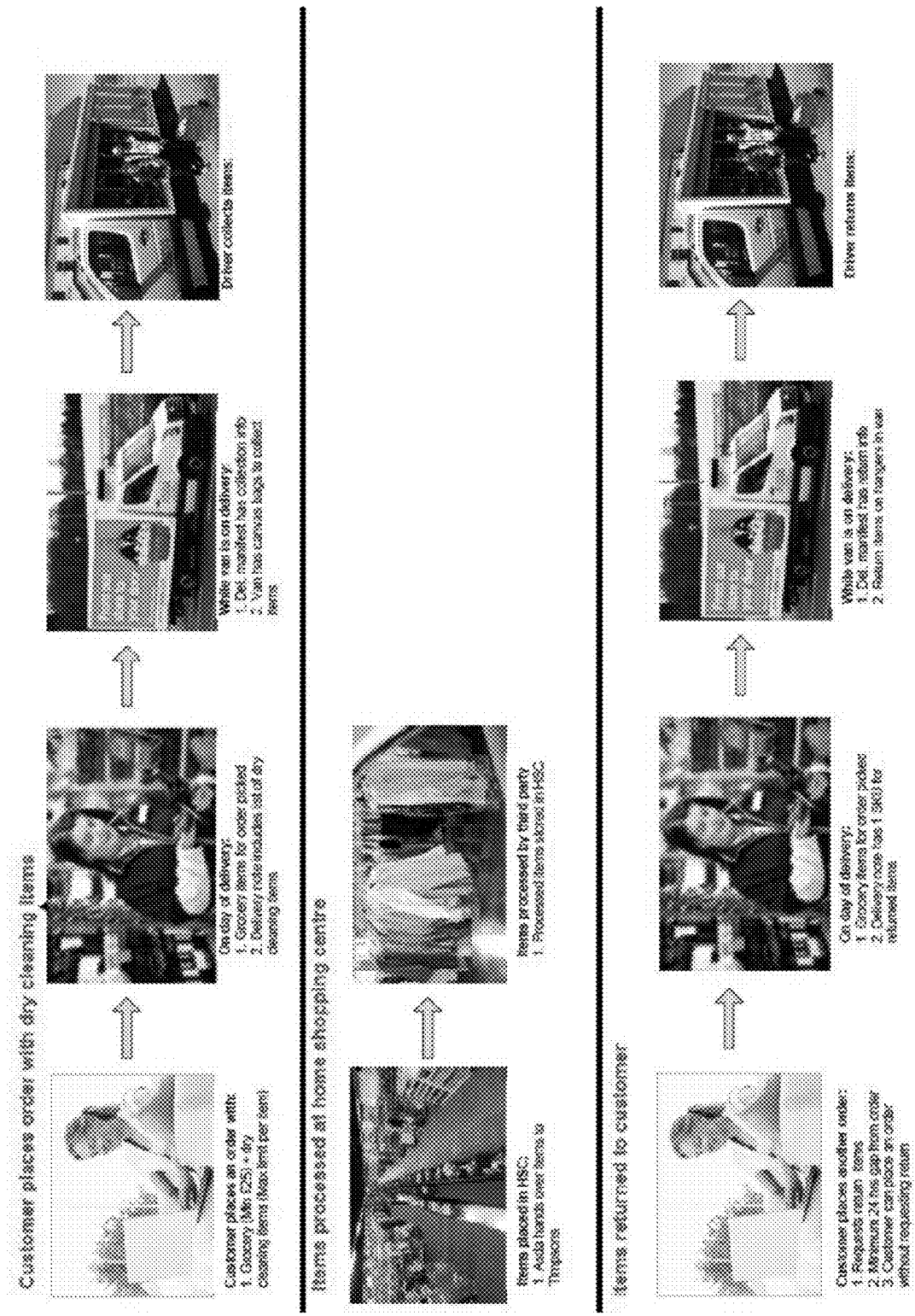
FIG. 11 is a flowchart of a method that may be used with the system shown in FIG. 1, according to an embodiment of the present invention.

In method step 216, the order server 16 generates a delivery order report 80 that is indicative of the customer delivery order request 32 including the selected consumer goods, the selected eligible customer-owned items, and the customer specified delivery location. In addition, the order server 16 transmits the delivery order report 80 to the order assembly server 24 and/or the delivery server 28 for use in assembling and delivering the selected consumer goods and the selected eligible customer-owned items to the customer specified location. In addition, the order server 16 may generate the delivery order report 80 including the pickup customer item record 68 for use in identifying the requested physical customer-owned item to be collected at the customer specified location. In addition, the order server 16 may generate the pickup customer item record 68 including a unique UPC associated with the customer-owned item designated for pick-up at the customer specified location to facilitate identifying the customer owned item 22. For example, as shown in FIG. 11, in one embodiment, the system 10 may receive a request from a customer to deliver one or more consumer goods being purchased online and receive a request to collect and service one or more customer-owned items. The system 10 generates a deliver order report and transmits the report to a corresponding home shopping center to facilitate assembling and delivering the order to the customer. The delivery service 30 then delivers the purchased goods to the customer and collects the customer-owned items identified by the customer and returns the customer-owned items to the home shopping center for servicing.

In one embodiment, upon receiving a request from the customer, the order server 16 may display one or more pending delivery orders 112 that have previously been placed by the customer, but have not yet been delivered to the customer, and allow the customer to modify the pending orders to include delivery and/or pick-up of customer owned items. For example, in one embodiment, the order server 16 may receive a request to modify a previous customer delivery order request from the customer and responsively retrieve and display the previous customer delivery order request associated with the customer. The order server 16 may also identify and display customer-owned items that are eligible for delivery and allow the customer to select at least one eligible customer-owner items and modify the previous customer delivery order request to include the selected customer-owned items. In addition, the order server 16 may allow the customer to modify the previous customer delivery order request to include a pick-up request including at least one physical customer-owned item to be collected upon delivery of the modified customer delivery order request.

Figure 9:
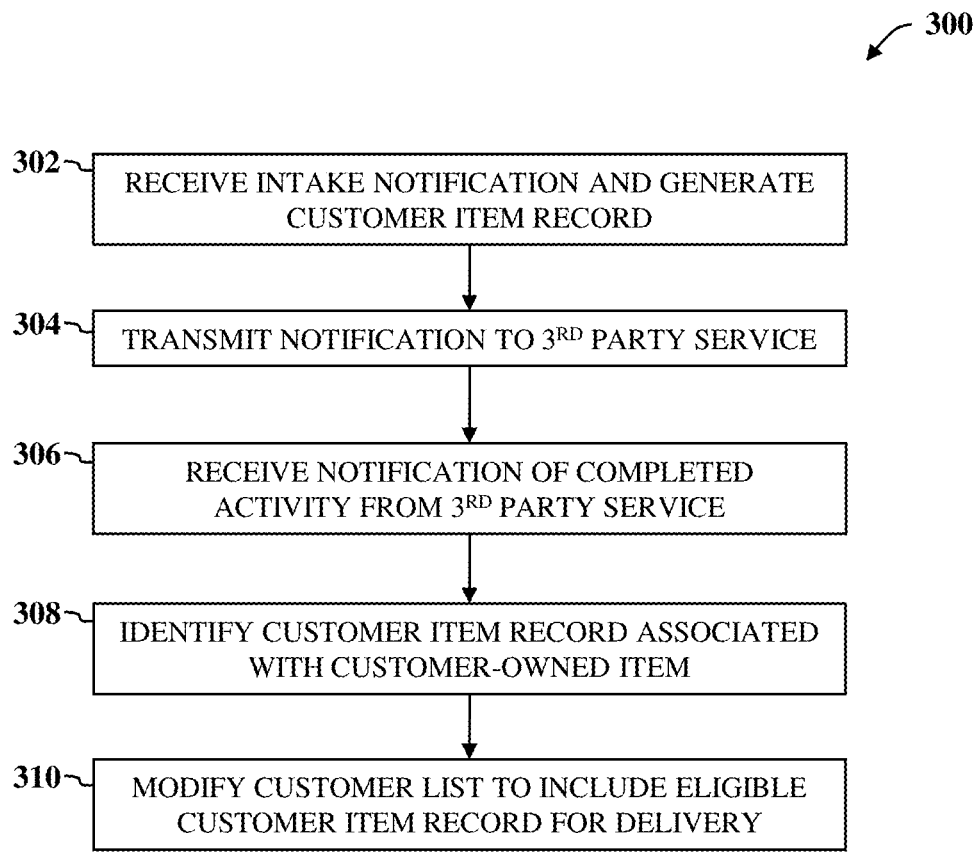
FIG. 9 is a flowchart of a method that may be used with the system shown in FIG. 1, according to an embodiment of the present invention.
Figure 10A:
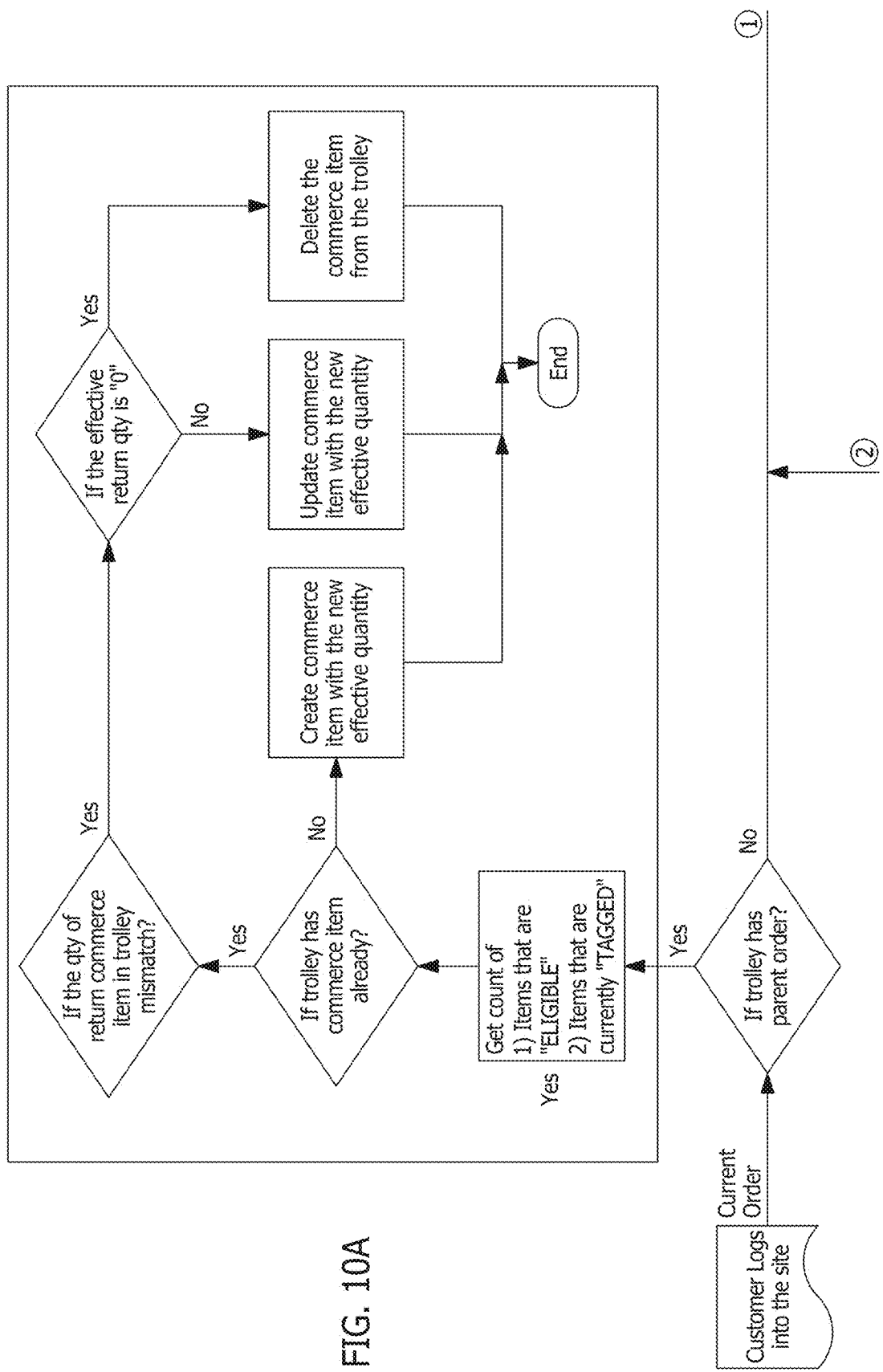
FIGS. 10A-10E are flowcharts of a method that may be used with the system shown in FIG. 1, according to an embodiment of the present invention.
Figure 10B:
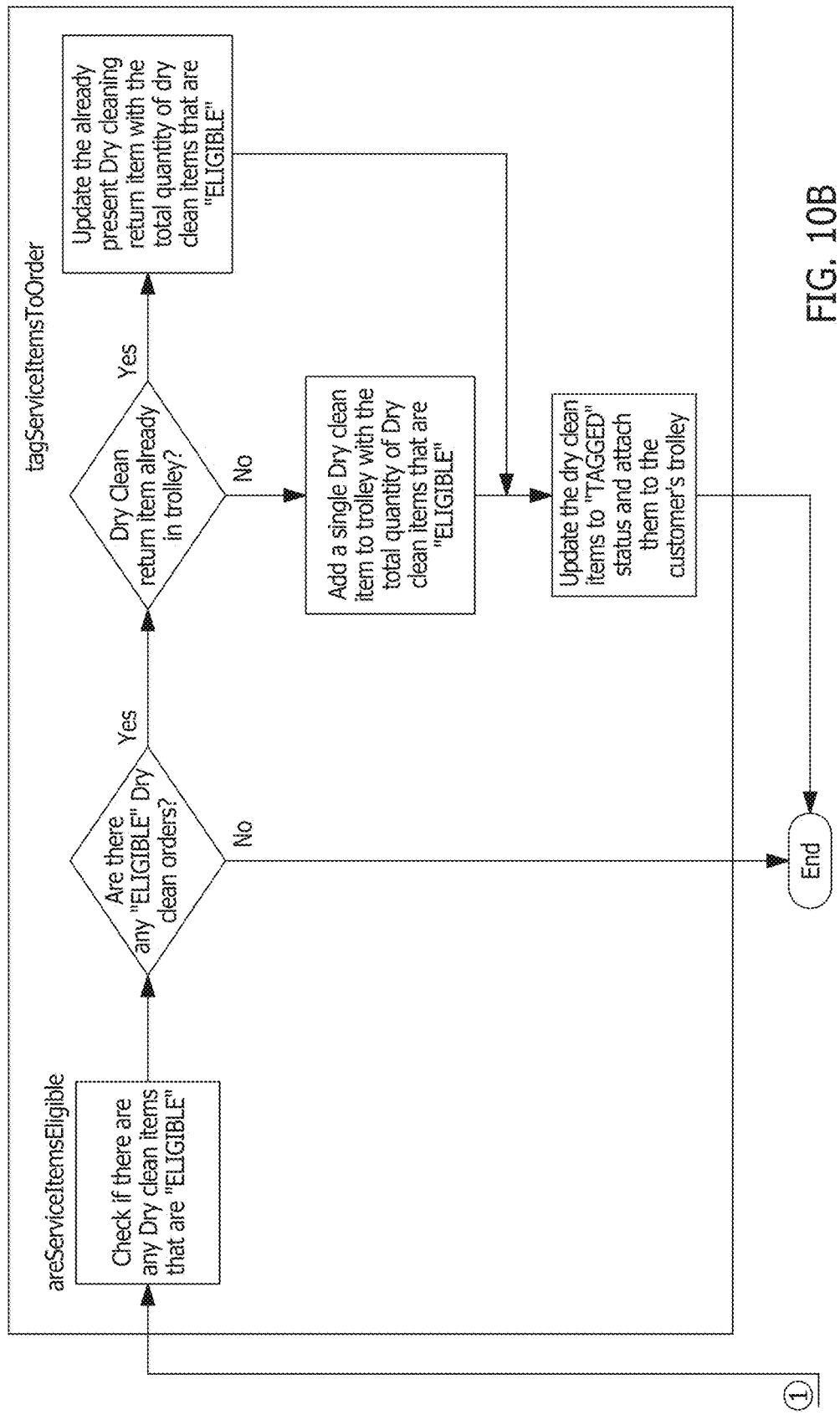
Figure 10C:
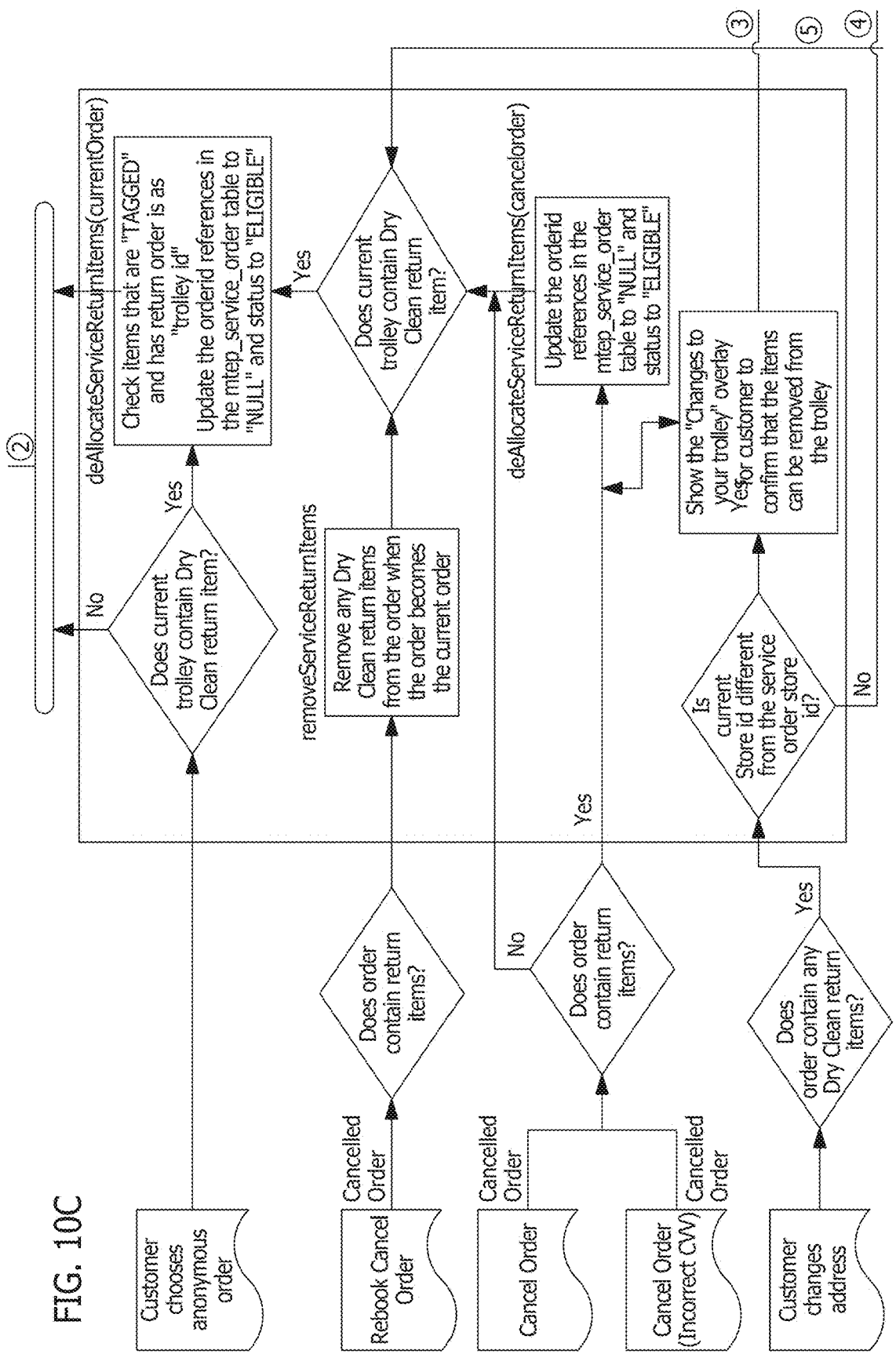
Figure 10D:
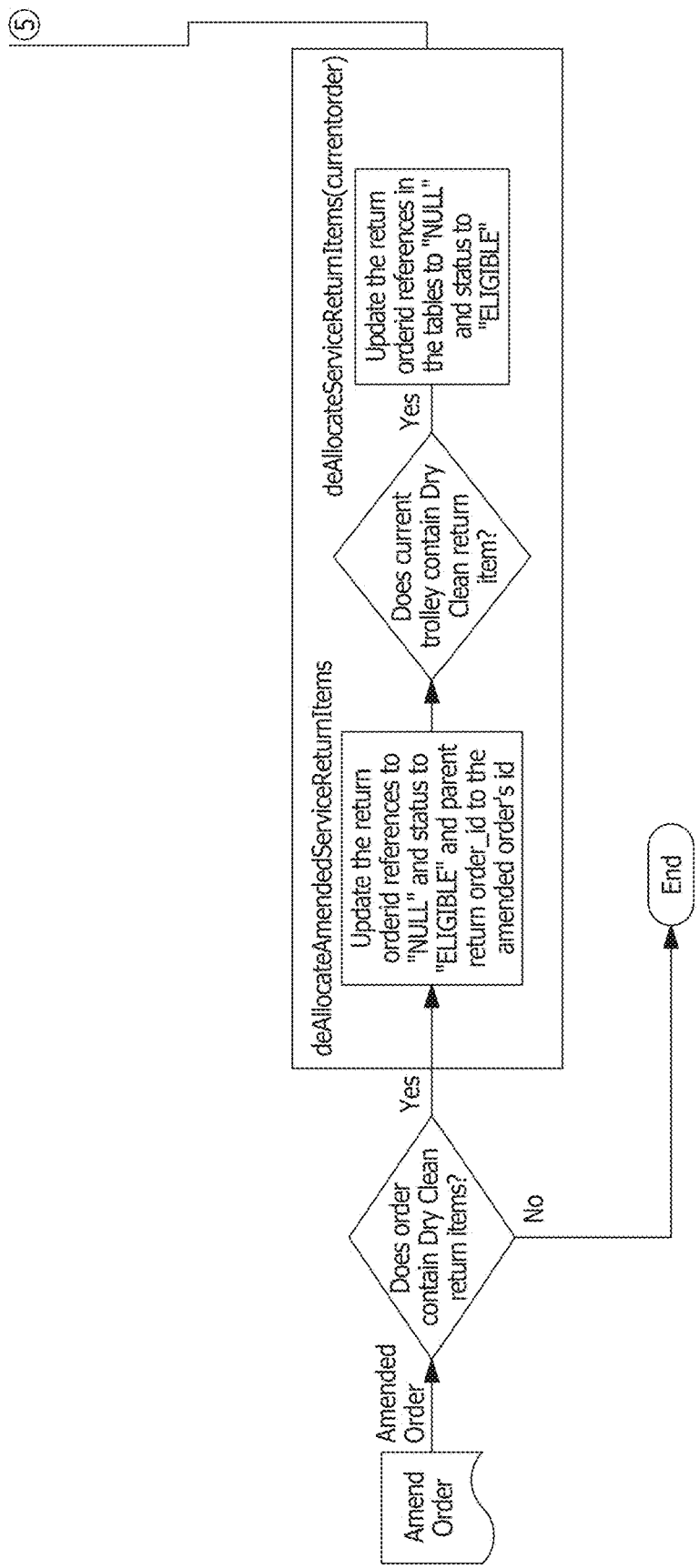
Figure 10E:
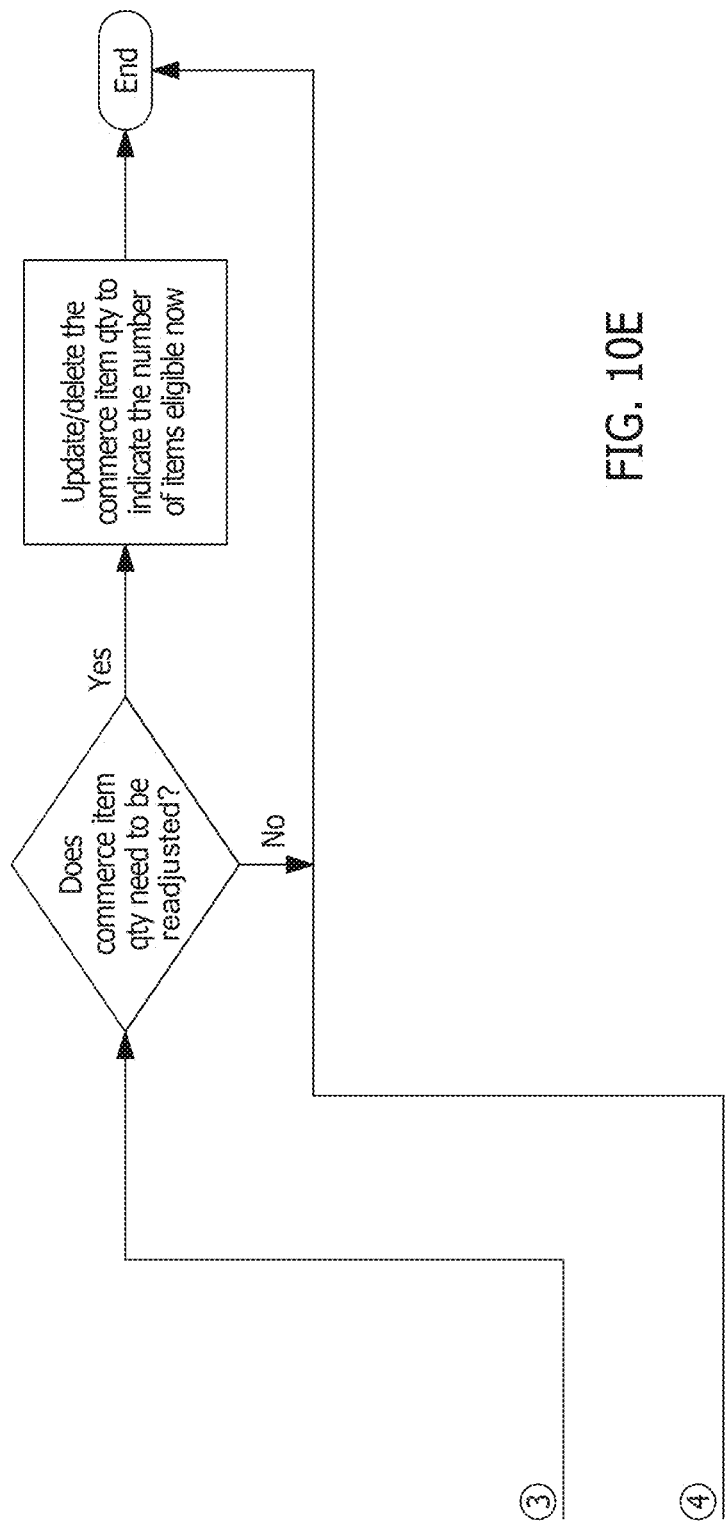

Referring to method 300 illustrated in FIG. 9, in method step 302, the order server 16 may receive a customer item intake notification from a delivery device 34 and/or assembler device 38 upon a customer-owned item being received and/or collected from the customer specified location by a delivery personnel and/or store employee. For example, in one embodiment, a customer delivery order may be delivered to a customer specified location by the delivery service 30 and/or delivery personnel. During delivery of the customer delivery order, the delivery personnel may also receive a customer-owned item for servicing. The delivery personnel may scan a corresponding UPC symbol displayed on the customer delivery report via the handheld device 36, which may transmit the intake notification including the scanned UPC to the order server 16. In one embodiment, the customer item intake notification may include a corresponding a customer ID. In addition, the customer item intake notification may be indicative of a physical customer-owned item being collected from the customer specified location. Upon receipt of the customer item intake notification, the order server 16 may identify a matching pickup customer item record 68 included in the customer list 20 and having a matching customer ID and/or item ID. In addition, the order server 16 may generate and store a collected customer item record 70 in the customer list 20 as a function of the identified customer item pickup record. The collected customer item record 70 is indicative of the collected physical customer-owned item in the corresponding customer list 20.

In one embodiment, the customer may leave a previously unidentified customer-owned item at the customer-specified location. The delivery personnel, upon delivering the customer delivery order to the customer specified location, may collect the previously unidentified customer-owned item and access the delivery device 34 to transmit a notification to the delivery server 28 and/or the order server 16 that the previously unidentified customer-owned item has been collected. The order server 16 may receive the customer item intake a notification from the delivery device 34 that is indicative of the unidentified customer-owned item being collected from the customer specified location and generate and store a customer item record associated with the collected customer-owned item in the corresponding customer list. In another embodiment, the order server 16 may receive the customer item intake a notification indicative of the previously unidentified customer-owned item from an assembly device 38 upon receipt of the corresponding customer-owned item from a store employee. In addition, in one embodiment, the customer-owned item may be received and/or collected at a first store location and transferred to a second store location for servicing. In addition, the customer-owned item may be included in a delivery order assembled at the second store location and returned to a customer-specified location from the second store location. The order server 16 may receive an indication from the order assembly order 24 that the customer-owned item is being transferred from the first store location to the second store location and responsively modify the corresponding customer item record to indicate the current location of the customer-owned item.

In method step 304, the order server 16 transmits a notification to the 3rd party server 40 upon receipt of the customer item intake notification to notify the $3^{rd}$ party service provider that a corresponding customer-owned item 22 has been collected from the customer and is available for servicing. In one embodiment, the notification includes a corresponding customer ID and item ID.

In method step 306, the order server 16 receives a completion notification from the $3^{rd}$ party server 40 that the service associated with the collected customer-owned item has been completed. The completion notification may include the corresponding customer ID and item ID.

In method step 308, the order server 16 identifies a matching collected customer item record 70 contained in corresponding customer list 20 based on the received customer ID and item ID.

In method step 310, upon receipt of the completion notification and identifying the matching customer item record 22, the order server 16 generates and stores an eligible customer item record 72 associated with the collected customer-owned physical item in the corresponding customer list 20 and modifies the customer list 20 to include the eligible customer item record.

In one embodiment, the customer-owned items 22 may be serviced within a store 12 and the order server 16 may receive a completion notification associated with a collected customer-owned item 70 from the order assembly server 24 upon completion of service performed in the store. For example, in one embodiment, the store may include a dry cleaning service area for providing dry cleaning and laundry services within the store. In another embodiment, the order server 16 may generate an eligible customer item record associated with the collected physical customer-owned item after a predefined period of time has elapsed from receiving the customer item intake notification. For example, in one embodiment, the order server 16 may generate the corresponding eligible customer item record after 24 hrs have elapsed since the item was collected from the customer. In another embodiment, the order server 16 may generate an eligible customer item record associated with the collected physical customer-owned item upon receiving notification of a completion of a predefined action associated the collected physical customer-owned item. For example, the order server 16 may generate the corresponding eligible customer item record upon receiving notification for the order assembly server 24 of the completion of the dry cleaning service associated with the customer-owned item.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
  a database configured to store a product list and a plurality of customer item lists, the product list including a plurality of consumer goods available for purchase by a customer, and each of the plurality of customer item lists including a unique customer identification ("ID") that matches one or more customer item records comprising a physical customer-owned item associated with a corresponding customer, wherein the database is configured to store the unique customer ID, and wherein the one or more customer item records comprise:
    collected customer item records indicating the physical customer-owned item previously collected from the corresponding customer, wherein one or more physical customer-owned items are serviced by a third party; and
    eligible customer item records, each indicating a status of a respective one of the physical customer-owned items, as serviced, and eligible for delivery; and
  a server computer system configured to:
    cause to be displayed a website including the plurality of consumer goods to the customer via a software application ("app") configured to be installed on a customer device and allow the customer to select at least one of the plurality of consumer goods for purchase, wherein the server computer system comprises a first processor and a first communication system, wherein the server computer system further comprises an order fulfillment system and a delivery system;
    receive, by the first communication system (a) of the server computer system and (b) in data communication with the software app on the customer device, a request from the customer to purchase and deliver the at least one of the plurality of consumer goods to a customer-specified location;
    generate a customer delivery order request, using the first processor (a) of the server computer system and (b) in data communication with the order fulfillment system, the customer delivery order request comprising the at least one of the plurality of consumer goods and the unique customer ID associated with the customer, wherein the order fulfillment system comprises a second processor and a second communication system;
    upon generating the customer delivery order request, by the first processor (a) of the server computer system and (b) in data communication with a first memory system of the database and (c) in data communication with the second processor of the order fulfillment system, (i) retrieve a customer item list associated with the unique customer ID from the database and (ii) identify the eligible customer item records included in the customer item list, wherein the second processor is in further data communication with an automatic retrieval system to automatically retrieve the plurality of consumer goods from a facility using one or more robots configured to read the customer item list associated with the customer delivery order request and wherein the plurality of customer item lists comprise the customer item list;
    generate, by the first processor (a) of the server computer system and (b) in data communication with the software app on the customer device and (c) in data communication with the delivery system, an eligible customer item webpage including a status of eligibility for delivery of first physical customer-owned items of the one or more physical customer-owned items associated with the eligible customer item records, wherein the delivery system comprises a third processor and a third communication system;
    cause to be displayed, by the third communication system (a) of the delivery system and (b) in data communication with the software app on the customer device, the eligible customer item webpage, on a graphical user interface on the customer device;

when the first physical customer-owned items of the one or more physical customer-owned items are eligible for delivery, prompt, by the first communication system (a) of the server computer system and (b) in data communication with the software app on the customer device and (c) by the third communication system of the delivery system, the customer via the graphical user interface of the customer device to select at least one of the first physical customer-owned items of the one or more physical customer-owned items eligible for delivery to be included in the customer delivery order request;

determine, by the first processor (a) of the server computer system and (b) in data communication with the software app on the customer device, whether the customer selected, via the graphical user interface of the customer device, the at least one of the first physical customer-owned items of the one or more physical customer-owned items eligible for delivery to be included in the customer delivery order request;

responsive to determining the customer selected the at least one of the first physical customer-owned items eligible for delivery to be included in the customer delivery order request, generate and cause to be displayed on the graphical user interface of the customer device, by the first processor (a) of the server computer system and (b) by the third communication system of the delivery system, and (c) in data communication with the software app on the customer device, a delivery order report comprising the customer delivery order request including the at least one of the plurality of consumer goods and the at least one of the first physical customer-owned items;

confirming, by the first processor (a) of the server computer system and (b) in data communication with the software app on the customer device and (c) by the third communication system of the delivery system, the customer-specified location, using a rule engine to apply a set of rules to the delivery order report for use in assembling and delivering the at least one of the plurality of consumer goods and the at least one of the first physical customer-owned items of the one or more physical customer-owned items to the customer-specified location as determined by the customer; and automatically manage, by the third processor (a) of the delivery system and (b) in data communication with the software app on the customer device, shipping logistics between (i) one or more stores and (ii) one or more third party entities selected to receive the at least one of the first physical customer-owned items of the one or more physical customer-owned items for delivery to be included in the customer delivery order request.

2. The system in accordance with claim 1, the first processor programmed to:

receive a pick-up request from the customer including at least one of a second physical customer-owned items of the one or more physical customer-owned items to be collected from the customer-specified location upon delivery of the customer delivery order request to the customer-specified location; and generate and store a pickup customer item record matching the at least one of the second physical customer-owned items of the one or more physical customer-owned items, as requested, the pickup customer item record including the unique customer ID and a pickup item identification ("ID").

3. The system in accordance with claim 2, the first processor programmed to:

generate the delivery order report including the pickup customer item record for use in identifying the at least one of the second physical customer-owned items of the one or more physical customer-owned items to be collected at the customer-specified location.

4. The system in accordance with claim 2, the first processor programmed to:

receive a customer item intake notification from an operator device including the unique customer ID, the customer item intake notification matching the at least one of the second physical customer-owned items of the one or more physical customer-owned items being collected from the customer-specified location;

identify the pickup customer item record matching a pickup customer record having a customer identification ("ID") matching the unique customer ID; and generate and store a collected customer item record matching the at least one of the second physical customer-owned items of the one or more physical customer-owned items, as collected, in a corresponding customer list as a function of the pickup customer item record.

5. The system in accordance with claim 4, the first processor programmed to:

generate an eligible customer item record associated with the at least one of the second physical customer-owned items of the one or more physical customer-owned items, as collected, after a predefined period of time has elapsed from receiving the customer item intake notification, the eligible customer item record matching the at least one of the second physical customer-owned items of the one or more physical customer-owned items being eligible for delivery.

6. The system in accordance with claim 4, the first processor programmed to:

generate an eligible customer item record associated with the at least one of the second physical customer-owned items of the one or more physical customer-owned items, as collected, upon receiving a notification of a completion of a predefined action associated with the at least one of the second physical customer-owned items of the one or more physical customer-owned items, as collected.

7. The system in accordance with claim 4, the first processor programmed to:

transmit a notification to a third party service system upon receipt of the customer item intake notification.

8. The system in accordance with claim 7, the first processor programmed to:

generate an eligible customer item record associated with at least one of the physical customer-owned items, as collected, upon receiving the notification from the third party service system.

9. The system in accordance with claim 1, the first processor programmed to:

receive a request to modify a previous customer delivery order request from the customer and responsively retrieve and cause to be displayed the previous customer delivery order request associated with the customer;

identify and cause to be displayed the at least one of the physical customer-owned items that are eligible for delivery; and allow the customer to select the at least one of the physical customer-owned items and modify the previous customer delivery order request to include the at least one of the physical customer-owned items, as selected.

10. The system in accordance with claim 1, the first processor programmed to:

allow the customer to modify a previous customer delivery order request to include a pick-up request including at least one of second physical customer-owned items of the one or more physical customer-owned items to be collected upon delivery of the previous customer delivery order request, as modified.

11. The system in accordance with claim 1, wherein the at least one of the physical customer-owned items is delivered to a first store location and transferred to a second store location for servicing, and returned to a customer-specified location from the second store location, the first processor programmed to:

modify a corresponding customer item record to indicate a location of the at least one of the physical customer-owned items.

12. The system in accordance with claim 1, wherein the customer leaves a previously unidentified physical customer-owned item at the customer-specified location, the first processor programmed to:

receive a customer item intake notification from an operator device including the unique customer ID, the customer item intake notification indicative of the physical customer-owned item being collected from the customer-specified location; and generate and store a customer item record associated with at least one physical customer-owned item in a corresponding customer list.

13. A method comprising:

storing, with a computer system using one or more processors, a product list and a plurality of customer item lists in a database, the product list including a plurality of consumer goods available for purchase by a customer, and each of the plurality of customer item lists including a unique customer identification ("ID") that matches one or more customer item records comprising a physical customer-owned item associated with a corresponding customer wherein the database is configured to store the unique customer ID, and wherein the one or more customer item records comprise:

collected customer item records indicating the physical customer-owned item previously collected from corresponding customer records, wherein one or more physical customer-owned items are serviced by a third party; and eligible customer item records, each indicating a status of a respective one of the physical customer-owned items, as serviced and eligible for delivery;

causing to be displaying, with the computer system, a website including the plurality of consumer goods to the customer via a software application ("app") configured to be installed on a customer device and allowing the customer to select at least one of the plurality of consumer goods for purchase, wherein a server computer system comprises a first processor and a first communication system, wherein the server computer system further comprises an order fulfillment system and a delivery system;

receiving, by the first communication system (a) of the server computer system and (b) in data communication with the software app on the customer device, a request from the customer to purchase and deliver the at least one of the plurality of consumer goods to a customer-specified location;

generating a customer delivery order request, using the first processor (a) of the server computer system and (b) in data communication with the order fulfillment system, the customer delivery order request comprising the at least one of the plurality of consumer goods and the unique customer ID associated with the customer, wherein the order fulfillment system comprises a second processor and a second communication system;

upon generating the customer delivery order request, by the first processor (a) of the server computer system and (b) in data communication with a first memory system of the database and (c) in data communication with the second processor of the order fulfillment system, (i) retrieving a customer item list associated with the unique customer ID from the database and (ii) identifying the eligible customer item records included in the customer item list, wherein the second processor is in further data communication with an automatic retrieval system to automatically retrieve the plurality of consumer goods from a facility using one or more robots configured to read the customer item list associated with the customer delivery order request, and wherein the plurality of customer item lists comprise the customer item list;

generating by the first processor (a) of the server computer system and (b) in data communication with the software app on the customer device and (c) in data communication with the delivery system, an eligible customer item webpage including a status of eligibility for delivery of first physical customer-owned items of the one or more first physical customer-owned items associated with the eligible customer item records, wherein the delivery system comprises a third processor and a third communication system;

causing to be displayed, by the third communication system (a) of the delivery system and (b) in data communication with the software app on the customer device, the eligible customer item webpage, on a graphical user interface on the customer device;

when the first physical customer-owned items of the one or more physical customer-owned items are eligible for delivery, prompting, by the first communication system (a) of the server computer system and (b) in data communication with the software app on the customer device and (c) by the third communication system of the delivery system, the customer via the graphical user interface of the customer device to select at least one of the first physical customer-owned items of the one or more physical customer-owned items eligible for delivery to be included in the customer delivery order request;

determining, by the first processor (a) of the server computer system and (b) in data communication with the software app on the customer device, whether the customer selected, via the graphical user interface of the customer device, the at least one of the first physical customer-owned items of the one or more physical customer-owned items eligible for delivery to be included in the customer delivery order request;

responsive to determining the customer selected the at least one of the first physical customer-owned items eligible for delivery to be included in the customer delivery order request, generating and cause to be displaying on the graphical user interface of the customer device, by the first processor (a) of the server computer system and (b) the third communication system of the delivery system, and (c) in data communication with the software app on the customer device, a delivery order report comprising the customer delivery order request including the at least one of the plurality of consumer goods and the at least one of the first physical customer-owned items;

confirming, by the first processor (a) of the server computer system and (b) in data communication with the software app on the customer device and (c) by the third communication system of the delivery system, the customer-specified location, the delivery order report for use in assembling and delivering the at least one of the plurality of consumer goods;

confirming, by the first processor (a) of the server computer system and (b) in data communication with the software app on the customer device and (c) by the third communication system of the delivery system, the customer-specified location, using a rule engine to apply a set of rules to the delivery order report for use in assembling the delivery order report for use in assembling and delivering the at least one of the plurality of consumer goods, as selected, and the at least one of the first physical customer-owned items, as selected, to the customer at the customer-specified location as determined by the customer; and automatically, by the third processor (a) of the delivery system and (b) in data communication with the software app on the customer device, managing shipping logistics between (i) one or more stores and (ii) one or more third party entities selected to receive the at least one of the first physical customer-owned items of the one or more physical customer-owned items for delivery to be included in the customer delivery order request.

14. The method in accordance with claim 13, further comprising:

receiving, with the computer system, a pick-up request from the customer including at least one second physical customer-owned item to be collected from the customer-specified location upon delivery of the customer delivery order request to the customer-specified location;

generating and storing, with the computer system, a pickup customer item record indicative of the at least one second physical customer-owned item, as requested, the pickup customer item record including the unique customer ID and a pickup item identification ("ID"); and generating, with the computer system, the delivery order report including a second pickup customer item record for use in identifying the at least one second physical customer-owned item, as requested, to be collected at the customer-specified location.

15. The method in accordance with claim 14, further comprising:

receiving, with the computer system, a customer item intake notification from an operator device including the unique customer ID, the customer item intake notification matching the at least one second physical customer-owned item being collected from the customer-specified location;

identifying, with the computer system, a pickup customer item record matching a pickup order record having a customer identification ("ID") matching the unique customer ID; and generating and storing, with the computer system, a collected customer item record matching the at least one second physical customer-owned items, as collected, in a corresponding customer list as a function of the pickup customer item record.

16. The method in accordance with claim 15, further comprising:

generating, with the computer system, an eligible customer item record associated with the at least one second physical customer-owned items, as collected, after a pre-defined period of time has elapsed from receiving the customer item intake notification, the eligible customer item record matching the at least one second physical customer-owned item being eligible for delivery.

17. The method in accordance with claim 15, further comprising:

generating, with the computer system, an eligible customer item record associated with the at least one second physical customer-owned items, as collected, upon receiving a notification of a completion of a predefined action associated with the at least one second physical customer-owned items.

18. The method in accordance with claim 13, further comprising:

transmitting, with the computer system, a notification to a third party service system upon receipt of a customer item intake notification; and generating, with the computer system, an eligible customer item record associated with at least one of the physical customer-owned items, as collected, upon receiving the notification from the third party service system.

19. The method in accordance with claim 13, further comprising:

receiving, with the computer system, a request to modify a previous customer delivery order request from the customer and responsively retrieving and displaying the previous customer delivery order request associated with the customer;

identifying and displaying, with the computer system, the at least one of the physical customer-owned items that are eligible for delivery; and allowing, with the computer system, the customer to select the at least one of the physical customer-owned items and modifying the previous customer delivery order request to include the at least one of the physical customer-owned items, as selected.

20. One or more non-transitory computer-readable storage media, having computer-executable instructions embodied thereon, wherein when executed by at least one processor, the computer-executable instructions cause the processor to:

cause to be displayed a website including a plurality of consumer goods to a customer via a software application ("app") configured to be installed on a customer device and allow the customer to select at least one of the plurality of consumer goods for purchase, wherein a server computer system comprises a first processor and a first communication system, wherein the server computer system further comprises an order fulfillment system and a delivery system;

receive, by the first communication system (a) of the server computer system and (b) in data communication with the software app on the customer device, a request from the customer to purchase and deliver the at least one of the plurality of consumer goods to a customer-specified location;

generate a customer delivery order request, using the first processor (a) of the server computer system and (b) in data communication with the order fulfillment system, the customer delivery order request comprising the at least one of the plurality of consumer goods and a unique customer identification ("ID") associated with the customer, wherein the order fulfillment system comprises a second processor and a second communication system;

upon generating the customer delivery order request, by the first processor (a) of the server computer system and (b) in data communication with a first memory system of a database and (c) in data communication with the second processor of the order fulfillment system, (i) retrieve a customer item list of a plurality of customer item lists associated with the unique customer ID from the database, the customer item list including customer item records indicative of physical customer-owned items associated with the customer, the customer item records including collected customer item records indicating the physical customer-owned items previously collected from the customer, wherein one or more physical customer-owned items being serviced by a third party, and (ii) identify eligible customer item records indicating a status of a respective one of the physical customer-owned items eligible for delivery, wherein the second processor is in further data communication with an automatic retrieval system to automatically retrieve the plurality of consumer goods from a facility using one or more robots configured to read the customer item list associated with the customer delivery order request;

identify the eligible customer item records included in the customer item list, as retrieved the plurality of customer item lists comprising the customer item list;

generate by the first processor (a) of the server computer system and (b) in data communication with the software app on the customer device and (c) in data communication with the delivery system, an eligible customer item webpage including a status of eligibility for delivery of first physical customer-owned items of the one or more physical customer-owned items associated with the eligible customer item records, wherein the delivery system comprises a third processor and a third communication system;

display, by the third communication system (a) of the delivery system and (b) in data communication with the software app on the customer device, the eligible customer item webpage, on a graphical user interface on the customer device;

when the first physical customer-owned items of the one or more physical customer-owned items are eligible for delivery, prompt, by the first communication system (a) of the server computer system and (b) in data communication with the software app on the customer device and (c) by the third communication system of the delivery system, the customer via the graphical user interface of the customer device to select at least one of the first physical customer-owned items of the one or more physical customer-owned items eligible for delivery to be included in the customer delivery order request;

determine, by the first processor (a) of the server computer system and (b) in data communication with the software app on the customer device, whether the customer selected, via the graphical user interface of the customer device, the at least one of the first physical customer-owned items of the one or more physical customer-owned items eligible for delivery to be included in the customer delivery order request;

responsive to determining the customer selected the at least one of the first physical customer-owned items eligible for delivery to be included in the customer delivery order request, generate and cause to be displayed on the graphical user interface of the customer device, by the first processor (a) of the server computer system and (b) the third communication system of the delivery system, and (c) in data communication with the software app on the customer device, a delivery order report comprising the customer delivery order request including the at least one of the plurality of consumer goods and the at least one of the first physical customer-owned items;

confirming, by the first processor (a) of the server computer system and (b) in data communication with the software app on the customer device and (c) by the third communication system of the delivery system, the customer-specified location, using a rule engine to apply a set of rules to the delivery order report for use in assembling and delivering the at least one of the plurality of consumer goods and the at least one of the first physical customer-owned items of the one or more physical customer-owned items to the customer-specified location as determined by the customer; and automatically manage, by the third processor (a) of the delivery system and (b) in data communication with the software app on the customer device, shipping logistics between (i) one or more stores and (ii) one or more third party entities selected to receive the at least one of the first physical customer-owned items of the one or more physical customer-owned items for delivery to be included in the customer delivery order request.

* * * * *